United States Patent
Thomas et al.

(10) Patent No.: US 11,603,060 B2
(45) Date of Patent: Mar. 14, 2023

(54) SYSTEM AND METHOD FOR MONITORING SEAT BELT ROUTING USING BOTH A WEBBING PAYOUT SENSOR AND AN IN-CABIN SENSOR

(71) Applicant: GM GLOBAL TECHNOLOGY OPERATIONS LLC, Detroit, MI (US)

(72) Inventors: Scott D. Thomas, Novi, MI (US); Michael Baltaxe, Ra'anana (IL); Kobi Nistel, Zoran (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 426 days.

(21) Appl. No.: 16/871,252

(22) Filed: May 11, 2020

(65) Prior Publication Data

US 2021/0347323 A1 Nov. 11, 2021

(51) Int. Cl.
*B60R 21/215* (2011.01)
*B60R 21/015* (2006.01)
*B60R 22/48* (2006.01)

(52) U.S. Cl.
CPC .. *B60R 21/01548* (2014.10); *B60R 21/01536* (2014.10); *B60R 21/01538* (2014.10); *B60R 21/01546* (2014.10); *B60R 21/01556* (2014.10); *B60R 21/01566* (2014.10); *B60R 22/48* (2013.01); *B60R 2022/4816* (2013.01); *B60R 2022/4825* (2013.01)

(58) Field of Classification Search
CPC ...... B60R 2022/4825; B60R 21/01548; B60R 21/01544; B60R 21/01538; B60R 21/01546; B60R 22/48
See application file for complete search history.

(56) References Cited

U.S. PATENT DOCUMENTS

| | | | |
|---|---|---|---|
| 10,953,850 B1* | 3/2021 | Pertsel | G06N 3/08 |
| 2004/0220705 A1* | 11/2004 | Basir | B60R 21/01538 |
| | | | 701/1 |
| 2009/0112408 A1* | 4/2009 | Kankanala | B60R 22/48 |
| | | | 701/45 |
| 2015/0251618 A1* | 9/2015 | Ghannam | B60R 22/48 |
| | | | 340/457.1 |

(Continued)

OTHER PUBLICATIONS

U.S. Appl. No. 16/149,730, filed Oct. 2, 2018, Thomas et al.

(Continued)

*Primary Examiner* — James A English

(57) ABSTRACT

A system includes a seat belt routing module and a user interface device (UID) control module. The seat belt routing module is configured to: determine a routing of a seat belt relative to an occupant in a vehicle seat based on input from a webbing payout sensor; and determine the seat belt routing based on an input from an in-cabin sensor. The in-cabin sensor includes at least one of a camera, an infrared sensor, an ultrasonic sensor, a radar sensor, and a lidar sensor. The UID control module is configured to control a user interface device to indicate that the seat belt is being worn improperly when: the seat belt routing determined using at least one of the webbing payout sensor and the in-cabin sensor is improper; and the seat belt routing determined using the webbing payout sensor corresponds to the seat belt routing determined using the in-cabin sensor.

20 Claims, 14 Drawing Sheets

(56) References Cited

U.S. PATENT DOCUMENTS

| | | | | |
|---|---|---|---|---|
| 2016/0046261 A1* | 2/2016 | Gulash | ............... | G06T 17/20 |
| | | | | 701/45 |
| 2016/0159320 A1* | 6/2016 | Andreen | ............. | B60R 22/48 |
| | | | | 382/103 |
| 2018/0152430 A1* | 5/2018 | Takahashi | ........... | H04L 63/08 |
| 2018/0258263 A1* | 9/2018 | Oshimo | ............. | C08L 9/06 |
| 2019/0061683 A1* | 2/2019 | Jessup | ............... | B60R 22/26 |
| 2019/0111889 A1* | 4/2019 | Michalke | ............ | B60R 22/48 |
| 2019/0152418 A1* | 5/2019 | Coughlin | ........... | B60N 2/0252 |
| 2020/0298796 A1* | 9/2020 | Cech | ............... | G06V 20/593 |

OTHER PUBLICATIONS

U.S. Appl. No. 16/253,312, filed Jan. 22, 2019, Baltaxe et al.
U.S. Appl. No. 16/389,497, filed Apr. 19, 2019, Thomas.
U.S. Appl. No. 16/389,504, filed Apr. 19, 2019, Thomas et al.
U.S. Appl. No. 16/448,932, filed Jun. 21, 2019, Baltaxe et al.
U.S. Appl. No. 16/679,659, filed Nov. 11, 2019, Thomas et al.

* cited by examiner

SYSTEM AND METHOD FOR MONITORING SEAT BELT ROUTING USING BOTH A WEBBING PAYOUT SENSOR AND AN IN-CABIN SENSOR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for monitoring seat belt routing using both a webbing payout sensor and an in-cabin sensor.

A seat belt assembly in a vehicle, which may be an autonomous vehicle, typically includes seat belt webbing attached to a tongue or latch plate, a seat belt buckle, a retractor, a lower anchor, and possibly a guideloop or D-ring through which the seat belt webbing passes. There are also seat belt systems that can contain a second retractor at the lower anchor. The seat belt may include both lap webbing and shoulder webbing. When the seat belt is buckled, the lap webbing extends from a first side of a vehicle seat to a buckle on a second side of the seat. The shoulder webbing extends diagonally from over an occupant's shoulder on the first side of the seat to the buckle on the second side of the seat. In many cases, the shoulder and lap webbing can be a single webbing, and the webbing can slidably pass through the tongue or latch plate as is the case for a single retractor system. Alternatively, the shoulder and lap webbing can be two separate webbings and can be attached to the tongue or latch plate for a two-retractor system.

The retractor includes a spool for dispensing and retracting the seat belt webbing. An occupant may pull the seat belt webbing to extract a desired length of seat belt webbing from the retractor. The occupant can insert the tongue into the buckle to secure the seat belt webbing around the occupant or child restraint seat. The occupant may press a button on the buckle to release the tongue and allow the spool to retract the seat belt webbing back into the retractor.

SUMMARY

A first example of a system according to the present disclosure includes a seat belt routing module and a user interface device (UID) control module. The seat belt routing module is configured to (i) determine a routing of a seat belt relative to an occupant in a seat of a vehicle based on input from a webbing payout sensor that measures a webbing payout of the seat belt, and (ii) determine the seat belt routing based on an input from an in-cabin sensor located within a cabin of the vehicle. The in-cabin sensor includes at least one of a camera, an infrared sensor, an ultrasonic sensor, a radar sensor, and a lidar sensor. The UID control module is configured to control a user interface device to indicate that the seat belt is being worn improperly when (i) the seat belt routing determined using at least one of the webbing payout sensor and the in-cabin sensor is improper, and (ii) the seat belt routing determined using the webbing payout sensor corresponds to the seat belt routing determined using the in-cabin sensor.

In one example, the system further includes a sensor state module configured to activate at least one of the webbing payout sensor and the in-cabin sensor when a buckle sensor indicates that the seat belt is buckled.

In one example, the system further includes a sensor state module configured to activate the in-cabin sensor when a first change in the webbing payout is greater than a first delta value.

In one example, the seat belt routing module is configured to repeatedly determine the seat belt routing based on the input from the in-cabin sensor when the in-cabin sensor is activated.

In one example, the sensor state module is configured to deactivate the in-cabin sensor when, after the seat belt routing module determines the seat belt routing using the in-cabin sensor, a second change in the webbing payout is less than a second delta value.

In one example, the seat belt routing module is configured to (i) determine a plurality of possible seat belt routings based on the webbing payout, and (ii) determine that the seat belt routing determined using the webbing payout sensor corresponds to the seat belt routing determined using the in-cabin sensor when one of the plurality of possible seat belt routings match the seat belt routing determined using the in-cabin sensor.

In one example, the seat belt routing module is configured to (i) determine a plurality of possible seat belt routings based on the input from the in-cabin sensor, and (ii) determine that the seat belt routing determined using the webbing payout sensor corresponds to the seat belt routing determined using the in-cabin sensor when one of the plurality of possible seat belt routings match the seat belt routing determined using the webbing payout sensor.

In one example, when the seat belt routing determined using the webbing payout sensor does not correspond to the seat belt routing determined using the in-cabin sensor, the seat belt routing module is configured to select one of the webbing payout sensor and the in-cabin sensor as a primary sensor, and the UID control module is configured to control the user interface device to indicate that the seat belt is being worn improperly when the seat belt routing determined using the primary sensor is improper.

In one example, the seat belt routing module is configured to select one of the webbing payout sensor and the in-cabin sensor as the primary sensor based on at least one of (i) whether the in-cabin sensor detects a shoulder webbing of the seat belt, (ii) a confidence in the seat belt routing determined using the webbing payout sensor, and (iii) a confidence in the seat belt routing determined using the in-cabin sensor.

In one example, the system further includes an occupant posture module configured to determine a posture of the occupant based on the input from the in-cabin sensor, and the seat belt routing module is configured to select the in-cabin sensor as the primary sensor when the occupant posture is non-erect.

In one example, the seat belt routing module is configured to (i) store a relationship between the webbing payout and the seat belt routing, and (ii) determine the seat belt routing based on the webbing payout using the stored relationship between the webbing payout and the seat belt routing.

In one example, the seat belt routing module is configured to adjust the stored relationship when a buckle sensor indicates that the seat belt is buckled and an acceleration sensor indicates that a deceleration of the vehicle is greater than a predetermined rate.

In one example, the seat belt routing module is configured to adjust the stored relationship when a buckle sensor indicates that the seat belt is buckled and, based on the input from the in-cabin sensor, the seat belt routing module determines that the seat belt is being properly worn.

In one example, the seat belt routing module is configured to adjust the stored relationship when, based on the input from the in-cabin sensor, the seat belt routing module determines that the seat belt is being properly stowed.

In one example, the system further includes an occupant detection module configured to detect whether a child restraint seat is present in the vehicle seat, and the seat belt routing module is configured to adjust the stored relationship based on whether the child restraint seat is present in the vehicle seat.

In one example, the seat belt routing module is configured to adjust the stored relationship when (i) at least one of the in-cabin sensor and a seat bottom position sensor indicates that the vehicle seat has moved, and based on the input from the in-cabin sensor, the seat belt routing module determines that the seat belt is being properly worn.

In one example, the seat belt routing module is configured to adjust the stored relationship when (i) at least one of the in-cabin sensor and a guideloop position sensor indicates that a guideloop for the seat belt has moved, and (ii) based on the input from the in-cabin sensor, the seat belt routing module determines that the seat belt is being properly worn.

A second example of a system according to the present disclosure includes a seat belt routing module and a user interface device (UID) control module. The seat belt routing module is configured to (i) determine a routing of a seat belt relative to an occupant in a seat of a vehicle based on input from a webbing payout sensor that measures a webbing payout of the seat belt, (ii) determine the seat belt routing based on an input from an in-cabin sensor located within a cabin of the vehicle, (iii) assign a first confidence to the seat belt routing determined using the webbing payout sensor, (iv) assign a second confidence to the seat belt routing determined using the in-cabin sensor, and (v) select one of the webbing payout sensor and the in-cabin sensor as a primary sensor based on the first and second confidences. The in-cabin sensor includes at least one of a camera, an infrared sensor, an ultrasonic sensor, a radar sensor, and a lidar sensor. The UID control module is configured to control a user interface device to indicate that the seat belt is being worn improperly when the seat belt routing determined using the primary sensor is improper.

In one example, the seat belt routing module is configured to (i) select the webbing payout sensor as the primary sensor when the first confidence is greater than the second confidence, and (ii) select the in-cabin sensor as the primary sensor when the second confidence is greater than the first confidence.

In one example, the seat belt routing module is configured to (i) assign the first confidence based on whether the seat belt routing determined using the webbing payout sensor is a lap webbing routing or a shoulder webbing routing, and (ii) assign the second confidence based on whether a field of view of the in-cabin sensor is obstructed.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
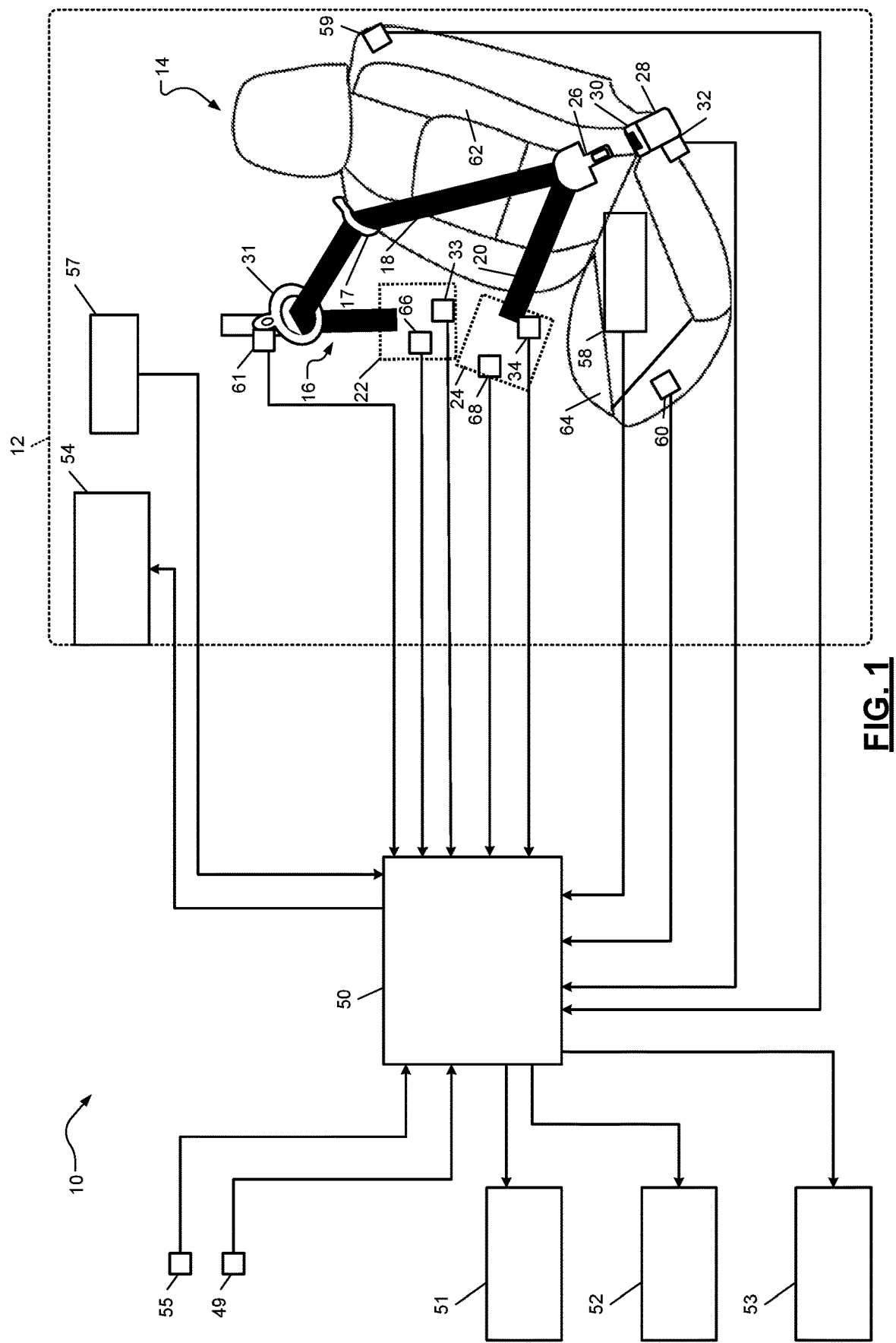
FIG. 1 is a schematic view of an example vehicle system according to the present disclosure.

A system and method may use the output of a seat belt buckle sensor and a seat belt payout sensor to determine whether the seat belt is being worn correctly. The seat belt buckle sensor detects whether a tongue or latch plate of a seat belt is inserted into and/or secured within a seat belt buckle. The seat belt payout sensor detects the payout or length of seat belt that is extended from a seat belt retractor. In one example, the seat belt payout sensor detects a rotational position of a spool within the seat belt retractor, and uses a predetermined relationship between the spool position and seat belt payout to determine the seat belt payout.

In one example, the system and method determines that the seat belt is being worn correctly when the seat belt buckle sensor indicates that the seat belt is buckled and the seat belt payout sensor indicates that the seat belt is routed properly. The system and method determines the routing of the seat belt based on the output of the seat belt payout sensor using a known or stored relationship between seat belt payout and seat belt routing. The system and method determines that the seat belt routing is proper when the seat belt payout is within a predetermined range.

The seat belt buckle sensor and the seat belt payout sensor have low power consumption. Thus, the system and method determines whether a seat belt is worn correctly based on the output of the seat belt buckle sensor and the seat belt payout sensor without consuming a lot of power. However, the system and method may have difficulty determining the seat belt routing based on the seat belt payout in certain conditions. For example, the system and method may have some difficulty determining the seat belt routing using the seat belt payout sensor when the seat belt is routed under the arm of an occupant. In addition, when determining the seat belt routing using the seat belt payout sensor, the system and method may have difficulty distinguishing between the seat belt being routed around a child restraint seat and the seat belt being routed around a small forward-facing child. Further, the system and method may have some difficulty determining if a seat belt has been routed over or through the routing guides formed by the belt guide wings on a backless booster seat type of child restraint seat or if the seat belt has been routed through a seat belt routing guide on the seat surface.

Moreover, the relationship between the seat belt payout and the seat belt routing may be affected by various events. These events include the posture of an occupant in the vehicle seat becoming non-erect, the occurrence of a rapid braking event, an occupant in the vehicle seat re-buckling the seat belt, a child restraint seat being placed in the vehicle seat, the position of the vehicle seat being moved, and/or the position of a seat belt guideloop being moved. Thus, the occurrence of any one of these events may cause the system and method to determine the seat belt routing inaccurately.

A system and method may determine the routing of a seat belt based on the output of an in-cabin sensor such as a camera mounted within a cabin of a vehicle. In one example, the system and method detects edges or surfaces of objects in an image captured by the in-cabin sensor, and determine the sizes, shapes, and/or locations of the objects based on the detected edges or surfaces. The system and method then determines whether the objects correspond to a seat, a seat belt, and/or an occupant in the seat based on the sizes, shapes, and/or locations of the objects. The system and method then determines the routing of the seat belt based on the relative locations of the seat belt and the occupant, skeletal features of the occupant, and/or facial features of the occupant such as eyes, nose, mouth, ears, chin or some combination of these.

Determining the seat belt routing based on the output of in-cabin sensor has several benefits. First, it enables the system and method to differentiate between different shoulder belt routings and lap belt routings. Second, it enables the system and method to detect the presence of a child restraint seat. Third, it enables the system and method to detect when the webbing of the seat belt is twisted. Fourth, it may enable the system to determine if a seat belt has been routed over or through the routing guides formed by the belt guide wings on a backless booster seat or through completely enclosed seat belt routing guides on a child restraint seat. Fifth, it may enable the system to determine if the seat belt has been routed through a seat belt routing guide on the seat surface.

However, there are some drawbacks to determining the seat belt routing based on the output of the in-cabin sensor. For example, the system and method may have difficulty detecting the seat belt routing when the seat belt is obscured or hidden from the field of view of the in-cabin sensor. In addition, the system and method may have difficulty detecting the seat belt routing in certain lighting conditions. Further, the in-cabin sensor and any associated vehicle interior illumination devices collectively have high power consumption, which can adversely affect vehicle range when the system is functioning.

A system and method according to the present disclosure determines whether a seat belt is worn correctly using a seat belt buckle sensor, a seat belt payout sensor, and an in-cabin sensor. The system and method determines whether a seat belt is worn correctly using all three of these types of sensors in a manner that takes advantages of their benefits while minimizing exposure to their drawbacks. In one example, the system and method continuously supplies power to, and monitors the output of, the seat belt buckle sensor and the seat belt payout sensors to determine whether the seat belt is worn correctly.

The system and method also periodically supplies power to, and monitors the output of, the in-cabin sensor to determine whether the seat belt is worn correctly. In one example, the system and method only supplies power to the in-cabin sensor upon the occurrence of one of the affirmation events that affect the relationship between the seat belt payout and seat belt routing. If one of these events occur, the system and method determines the seat belt routing using the in-cabin sensor, and adjusts the stored relationship between the seat belt payout and the seat belt routing if appropriate. Thereafter, the system and method stops supplying power to the in-cabin sensor, and determines the seat belt routing based on the output of the seat belt payout sensor using the stored relationship as adjusted.

In this manner, the system and method uses the in-cabin sensor to improve the accuracy of the seat belt routing determined using the webbing payout sensor. In addition, the system and method only uses the in-cabin sensor when necessary to minimize the amount of power required to determine the seat belt routing or for conditions that make it difficult to accurately determine the seat belt routing using the seat belt payout sensor alone. Further, after determining the seat belt routing, the system and method may choose between the seat belt payout sensor and the in-cabin sensor based on the confidences of these sensors associated with the seat belt routing determined. For example, if the seat belt is routed behind the back of an occupant so that the seat belt is at least partially obscured from the field of view of the in-cabin sensor, the confidence of the in-cabin sensor associated with this seat belt routing may be low. As a result, the system and method may choose to use the seat belt payout sensor to detect this type of seat belt routing.

Referring to FIG. 1, an example vehicle system 10 includes a cabin 12 with a seat 14 having a seat belt 16. The seat belt 16 includes a first or shoulder webbing 18 and a second or lap webbing 20. The shoulder webbing 18 is dispensed from a first retractor 22 and the lap webbing 20 is dispensed from a second retractor 24. More specifically, an occupant may pull the seat belt 16 from the first and second retractors 22 and 24 until the seat belt 16 is an appropriate length to be buckled. Other systems may only have the first retractor 22 and may have the end of the lap webbing 20 attached to vehicle or seat structure (not shown). The occupant can secure the seat belt 16 by inserting a latch plate or tongue 26 of the seat belt 16 into a buckle 28. The occupant can release the seat belt 16 or unbuckle the seat belt 16 by pressing a button 30 on the buckle 28. The first and second retractors 22 and 24 can then retract the seat belt 16. The first and second retractors 22 and 24 can be mounted to vehicle structure within the cabin 12 and/or to the seat 14.

The shoulder webbing 18 and the lap webbing 20 are fixed to one another as well as the tongue 26. For example, the tongue 26 may be sewn into the lap webbing 20 and the shoulder webbing 18. Alternatively, the tongue 26 may be sewn into the lap webbing 20, and the shoulder webbing 18 may be mechanically fastened to the tongue 26. The shoulder webbing 18 is routed through a guideloop 31 attached to vehicle or body structure, and optionally through a routing guide 17 on the seat 14. The routing guide 17 may permanently encapsulate the shoulder webbing 18 or temporarily encapsulate it if the shoulder webbing 18 can be removed from the routing guide 17. The vertical position of the guideloop 31 may be adjustable to accommodate various occupant shoulder heights.

In another approach, the second retractor 24 is omitted, and a single webbing slideably passes through the tongue 26. The portion of the webbing between the tongue and the first retractor 22 is the shoulder webbing 18. The other portion of the webbing is the lap webbing 20. The length of the shoulder webbing 18 and the lap webbing 20 changes based on the slideable position of the tongue 26

The buckle 28 can be in a buckled position or an unbuckled position. When the buckle 28 is in a buckled position, a locking member (not shown) within the buckle 28 engages the tongue 26 to secure the tongue 26 in the buckle 28. When the seat belt button 30 is pressed, the locking member disengages the tongue 26 and a spring-loaded ejector mechanism (not shown) biases the locking member into the unbuckled position. The locking member remains in the unlocked position until the tongue 26 is inserted into the buckle 28, forcing the locking member into the buckled position to secure the tongue 26.

A buckle sensor 32, which may be a buckle switch, detects whether the tongue 26 of the seat belt 16 is secured in the buckle 28 based on the position of the spring-loaded ejector mechanism or the tongue 26. Alternatively, the buckle sensor 32 may detect whether the seat belt button 30 is pressed. The buckle sensor 32 may be a Hall-effect sensor that varies its voltage output in response to a magnetic field. The buckle sensor 32 generates a buckle state (BS) signal indicating whether the tongue 26 of the seat belt 16 is secured in the buckle 28 and/or whether the seat belt button 30 is pressed. The buckle sensor 32 may alternatively be a reed switch, mechanical sensor, or any other sensor or switch that detects whether the tongue 26 is secured in the buckle 28.

The first retractor 22 may be an automatic locking retractor. As such, the first retractor 22 can include a first spool attached to a first control disc (not shown). When the occupant extracts the shoulder webbing 18 of the seat belt 16 from the first retractor 22 to a first predetermined length at or near full extraction, a first ratchet (not shown) engages the first control disc to prevent rotation of the first spool and the first control disc in the direction of shoulder webbing 18 extraction. However, engagement of the first ratchet with the first control disc does not prevent retraction of the shoulder webbing 18. Thus, until the first retractor 22 is deactivated (i.e., the shoulder webbing 18 is retracted to a second predetermined length to disengage the first ratchet from the first control disc), the control disc and the first spool can only rotate in one direction and the shoulder webbing 18 can tighten (i.e., retract), but cannot loosen (i.e., extend). This feature is used to attach child restraint seats to the vehicle via the seat belt 16.

The second retractor 24, if present, may be similar to the first retractor 22, and may also be an automatic locking retractor. More specifically, the second retractor 24 can include a second spool attached to a second control disc (not shown). When the occupant extracts the lap webbing 20 of the seat belt 16 from the second retractor 24 to the first predetermined length, a second ratchet (not shown) engages the second control disc to prevent rotation of the second spool and the second control disc in the direction of lap webbing 20 extraction. However, engagement of the second ratchet with the second control disc does not prevent retraction of the lap webbing 20, Thus, until the second retractor 24 is deactivated (i.e., the lap webbing 20 is retracted to the second predetermined length to disengage the second ratchet from the second control disc), the second control disc and the second spool can only rotate in one direction and the lap webbing 20 can tighten (i.e., retract), but cannot loosen (i.e., extend). Although the first and second retractors 22 and 24 are described as automatic locking retractors, in various implementations, the first and second retractors 22 and 24 may not be automatic locking retractors. If the first and second retractors 22 and 24 are not automatic locking retractors, they may dispense and retract the seat belt 16 without providing the function of securing a child restraint seat.

The occupant typically deactivates the first retractor 22 by retracting the shoulder webbing 18 into the first retractor 22 to the second predetermined length. Retracting the shoulder webbing 18 to the second predetermined length may include retracting a significant portion of shoulder webbing 18 into the first retractor 22. In one example, retracting the shoulder webbing 18 into the first retractor 22 includes retracting almost the entire shoulder webbing 18 into the first retractor 22. The occupant may similarly deactivate the second retractor 24 by retracting the lap webbing 20 into the second retractor 24 to the second predetermined length. When the occupant retracts the shoulder webbing 18 or the lap webbing 20 to the second predetermined length, the respective first or second ratchet disengages from the respective first or second control disc. The retraction of the respective webbing 18, 20 to the second predetermined length enables the first or second control disc and the respective first or second spool to freely rotate in either direction. The occupant can then use the seat belt 16 normally or engage one or both of the first and second retractors 22 and 24 by extracting the respective webbing 18 and 20 to the first predetermined length.

The first retractor 22 includes a first or shoulder webbing sensor 33. The shoulder webbing sensor 33 generates a shoulder webbing payout (SWP) signal indicating a shoulder webbing payout. The shoulder webbing payout corresponds to a length of shoulder webbing 18 of the seat belt 16 dispensed from the first retractor 22. The second retractor 24, if present, includes a second or lap webbing payout sensor 34. The lap webbing payout sensor 34 generates a lap webbing payout (LWP) signal indicating a lap webbing payout. The lap webbing payout corresponds to a length of lap webbing 20 of the seat belt 16 disposed from the second retractor 24. For the case when only a first retractor 22 is present, the SWP signal may indicate the combined shoulder webbing payout and lap webbing payout.

The outputs of the shoulder and lap webbing payout sensors 33 and 34 are inputs to a body control module (BCM) 50. The BCM 50 may determine the routing of the seat belt 16, and thereby identify when the seat belt 16 is incorrectly worn, based on the SWP signal and the LWP signal. Incorrect wearing of the seat belt 16 may be referred to as a seat belt use error. For example, the BCM 50 may store a relationship between webbing payout and seat belt routing, and determine the seat belt routing based on the SWP and LWP signals using the stored relationship. For the case when only retractor 22 is present, the BCM 50 may use the SWP signal to determine the routing of the seat belt 16 without using a LWP signal.

The BCM 50 may control a user interface device 54 in the cabin 12 of the vehicle, such as an audible warning, an electronic display, or tactile feedback to display a message indicating that the seat belt use error is present. For example, the BCM 50 controls the user interface device 54 to generate a visual message (e.g., text, a light, and/or a symbol), an audible message (e.g., a chime), and/or a tactile message (e.g., a vibration) indicating that the seat belt use error is present. The BCM 50 may determine whether the seat belt use error is present based on the SWP signal and, if provided, the LWP signal. The occupant may interact with the user interface device 54 to acknowledge the message, in which case the BCM 50 may disable (e.g., stop generating) the message.

The BCM 50 may also control the speed of the vehicle based on whether the seat belt use error is present. The BCM 50 may also control the speed of the vehicle by sending a vehicle speed instruction to at least one of an engine control module (ECM) 51, a transmission control module (TCM) 52, and an electronic brake control module (EBCM) 53. The ECM 51 controls an engine (not shown). The TCM 52 controls operation of a transmission (not shown). The TCM 52 may control gear selection within the transmission and one or more torque transfer devices (e.g., a torque converter, one or more clutches, etc.) (not shown). The EBCM 53 selectively controls electronically-controlled friction brakes (not shown) of the vehicle.

The vehicle system 10 also includes a vehicle speed sensor 55 that measures the speed of the vehicle. The ECM 51, the TCM 52, and/or the EBCM 53 may control the speed of the vehicle based on the measured vehicle speed using closed-loop control. The vehicle speed sensor 55 may output the measured vehicle speed to the BCM 50, and the BCM 50 may relay the measured vehicle speed to the ECM 51, the TCM 52, and/or the EBCM 53. Alternatively, the vehicle speed sensor 55 may output the measured vehicle speed directly to the ECM 51, the TCM 52, and/or the EBCM 53.

The BCM 50, the ECM 51, the TCM 52, and/or the EBCM 53 may determine the acceleration of the vehicle by integrating the measured vehicle speed with respect to time. Additionally or alternatively, the vehicle system 10 may include a vehicle accelerometer 49 that measures the acceleration of the vehicle. The vehicle accelerometer 49 may generate a vehicle acceleration (VA) signal indicating the measured vehicle acceleration and output the VA signal to the BCM 50.

The vehicle system 10 also include one or more in-cabin sensors 57. The in-cabin sensors 57 may include sensors such as a camera, an infrared sensor, an ultrasonic sensor, a radar sensor, a lidar sensor, or a combination thereof. In one example, the in-cabin sensors 57 are cameras, the vehicle includes multiple seats 14, and the vehicle includes one in-cabin sensor 57 for each seat 14. Each camera is operable to generate an image of the seat 14, the seat belt 16, and an occupant in the seat 14. The in-cabin sensors 57 may alternatively cover more than one vehicle seating position. In addition, more than one in-cabin sensor 57 can be used for a single seating position. Further, more than one sensor technology can be used, and the BCM 50 may stitch together information from each in-cabin sensor 57.

The in-cabin sensor 57 may take continuous images or take images periodically at specific times (e.g., before, during, or after the ride). An output of the in-cabin sensor 57 may be an input to the BCM 50. For example, the BCM 50 may detect, in an image from the in-cabin sensor 57, edges of the seat belt 16, the surface of the seat belt 16, and/or an object in the seat 14. The seat belt 16 can have different markings or embedded material that the in-cabin sensors 57 can detect to enable distinguishing the seat belt 16 from its surroundings. The BCM 50 may use the detected edges or surface of the seat belt 16 to determine the routing of the seat belt 16 in a two- or three-dimensional space. The BCM 50 may use the detected edges of an object in the seat 14 to detect the presence of an occupant and/or a child restraint seat in the seat 14. The BCM 50 may also use the inputs from the in-cabin sensors 57 to detect a size and position of the occupant. The BCM 50 may use the size and position of the occupant to adjust the stored relationship between webbing payout and seat belt routing.

The BCM 50 may use the inputs from the buckle sensor 32, the webbing payout sensor(s) 33 (and 34 if present), and the in-cabin sensors 57 to determine whether an occupant in the seat 14 is wearing the seat belt 16 properly. Each of the buckle sensor 32, the webbing payout sensor(s) 33 (and 34 if present), and the in-cabin sensors 57 has unique strengths and weaknesses. Thus, the BCM 50 may more accurately and robustly determine whether the seat belt 16 is being properly worn using the inputs from all three types of sensors as opposed to using the inputs from only one of the three types.

The strengths of the buckle sensor 32 include low power consumption and the ability to detect whether the seat belt 16 is buckled. The weakness of the buckle sensor 32 is that its output cannot be used to determine seat belt routing. The strengths of the webbing payout sensor(s) 33 (and 34 if present) include low power assumption and the ability to detect the payout of the shoulder and lap webbings 18 and 20. In addition, the webbing payout(s) detected by the webbing payout sensor(s) 33 (and 34 if present) can be used to determine the seat belt routing in most conditions.

The weaknesses of the webbing payout sensor(s) 33 (and 34 if present) include the inability to detect whether the seat belt 16 is buckled. In addition, it is difficult to identify when the seat belt 16 is routed under the arm of an occupant using the output of the webbing payout sensor(s) 33 (and 34 if present). Further, it is difficult to use the output of the webbing payout sensors 33 (and 34 if present) to distinguish between the seat belt 16 being routed around a child restraint seat and the seat belt 16 being routed around a small forward-facing child. Finally, it is difficult to use the output of the webbing payout sensor(s) 33 (and 34 if present) to determine whether the seat belt 16 is routed through the routing guide 17, over or through the routing guides formed by the routing wings on a backless booster child restraint seat, or through completely enclosed routing guides on other types of child restraint seats.

The strengths of the in-cabin sensors 57 include the ability to differentiate between various shoulder and lap webbing routings based on the output of the in-cabin sensors 57. In addition, the output of the in-cabin sensors 57 can be used to detect the presence of a child restraint seat in the seat 14. Further, the output of the in-cabin sensors 57 can be used to detect when the shoulder or lap webbing 18 or 20 is twisted or if the shoulder webbing 18 passes through the routing guide 17. Moreover, the output of the in-cabin sensors 57 can be used to detect if the lap webbing 20 passes over or through the routing guides formed by the webbing routing wings on a backless booster seat, or through completely enclosed webbing routing guides on a child restraint seat if these are visible to the in-cabin sensors 57.

The weaknesses of the in-cabin sensors 57 include high power consumption, the potential need for power consuming interior illuminators, and the inability to detect whether the seat belt 16 is buckled. In addition, it is difficult to determine the seat belt routing based on the output of the in-cabin sensor 57 when the seat belt 16 is obscured or hidden from the field of view of the in-cabin sensors 57. Further, the output of the in-cabin sensors 57 may be adversely affected by lighting conditions.

The BCM 50 may use the above strengths of the buckle sensor 32, the webbing payout sensor(s) 33 (and 34 if present), and the in-cabin sensors 57 while avoiding the above weaknesses of the sensors. For example, the BCM 50 may continuously monitor the output of the buckle sensor 32 since the buckle sensor 32 has low power consumption. In addition, the BCM 50 may continuously or periodically monitor the output of the webbing payout sensor(s) 33 (and 34 if present). Further, the BCM 50 may only periodically monitor the in-cabin sensors 57 since the in-cabin sensors 57 have high power consumption.

In one example, the BCM 50 only turns on or activates the in-cabin sensors 57 when the webbing payouts measured by the webbing payout sensor(s) 33 (and 34 if present) change by an amount that is greater than a threshold (e.g., a predetermined value or delta value). At that point, the BCM 50 determines the seat belt routing using the in-cabin sensors 57 and, based on the seat belt routing determined, adjusts the stored relationship between webbing payout and seat belt routing if necessary. The BCM 50 may then turn off or deactivate the in-cabin sensors 57, and accurately determine the seat belt routing using the input from the webbing payout sensor(s) 33 (and 34 if present) alone. In various implementations, the BCM 50 may keep the in-cabin sensors 57 on or activated continuously (e.g., at all times when the vehicle ignition is in an on position) if the power consumption of the in-cabin sensors 57 and associated illuminators is acceptable.

The vehicle system 10 may also include an occupant detection device 58, such as a weight pad. The weight pad may measure the weight of objects or people in the seat 14. The occupant detection device 58 may alternatively include pressure sensors, ohmmeters, capacitive sensors, electric field proximity sensors, biometric sensors, and/or other types of sensors. Weight, pressure, resistance, capacitive, electric field, and biometric sensor systems are typically located within the seat 14. However, they could be located outside the seat 14 and be in communication with the seat 14 such as being integrated within a seat-to-body attachment structure. In addition, one or more in-cabin sensors 57 can be used to provide and assess occupant images and thus, the in-cabin sensors 57 can be an occupant detection device. An output of the occupant detection device 58 is an input to the BCM 50. The BCM 50 may not instruct the ECM 51, the TCM 52, and the EBCM 53 to adjust the speed of the vehicle based on the first or lap webbing payout when the occupant detection device 58 indicates that the seat 14 is unoccupied.

The BS signal is also an input to the BCM 50. The BCM 50 identifies that the tongue 26 of the seat belt 16 is disengaged from or engaged with the buckle 28 based on the BS signal and/or the input from the occupant detection device 58. The BCM 50 may not instruct the ECM 51, the TCM 52, and/or the EBCM 53 to adjust the speed of the vehicle when the BS signal indicates that the tongue 26 of the seat belt 16 is disengaged from the buckle 28 of the seat belt 16 or the occupant detection device indicates that an occupant is not present. Additionally or alternatively, the BCM 50 may instruct the ECM 51, the TCM 52, and/or the EBCM 53 to adjust the speed of the vehicle when the BS signal indicates that the tongue 26 of the seat belt 16 is disengaged from the buckle 28 of the seat belt 16 if the occupant detection device 58 or the in-cabin sensor 57 indicates that the occupant is present.

The vehicle system 10 further includes a seat back position sensor 59 and a seat bottom position sensor 60. The seat back position sensor 59 is located on a back 62 of the seat 14 and the seat bottom position sensor 60 is located on a bottom 64 of the seat 14. The outputs of the seat back position sensor 59 and the seat bottom position sensor 60 are inputs to the BCM 50. The seat back position sensor 59 generates a seat back position (BKP) signal indicating an angle of the seat back 62 relative to the seat bottom 64. The seat bottom position sensor 60 generates a seat bottom position (BMP) signal indicating a fore-aft or longitudinal position of the seat bottom 64 relative to the second retractor 24 or a certain location on a body of the vehicle. The BMP signal may also indicate a vertical position of the seat bottom 64 and/or an angle of the seat bottom 64 relative to a horizontal plane.

In one example, the seat back position sensor 59 and the seat bottom position sensor 60 are discrete position switches that detect seat position relative to a certain location on the vehicle body. In another example, the seat back position sensor 59 and the seat bottom position sensor 60 provide continuous position information. The BCM 50 may adjust webbing length thresholds used to identify whether the seat belt is worn correctly based on the BKP signal and the BMP signal.

In addition to or instead of using the seat position sensors 59, 60 to determine seat position, the BCM 50 may use the in-cabin sensor 57 to determine seat position. For example, the BCM 50 may detect edges of the seat back 62 and the seat bottom 64, or portions of surfaces of the seat back 62 and the seat bottom 64, in an image from the in-cabin sensor 57. The BCM 50 can determine the locations and angles of the edges or surfaces based on a predetermined relationship between locations and angles in the image and locations and angles of edges in a predetermined seat position profile. The BCM 50 determines the seat position based on a comparison between the image and the predetermined seat position profile.

The vehicle system 10 further includes a guideloop position sensor 61. The guideloop position sensor 61 is located on, within, or proximate to the guideloop 31. The outputs of the guideloop position sensor 61 is an input to the BCM 50. The guideloop position sensor 61 generates a guideloop position (GLP) signal indicating a position (e.g., vertical position) of the guideloop 31 relative to the seat back 62 and/or a discrete point on a body of the vehicle.

Additionally or alternatively, the BCM 50 may use the output from the in-cabin sensor 57 to determine guideloop position. For example, the BCM 50 may detect edges of the guideloop 31, or portions of surfaces of the guideloop 31, in an image from the in-cabin sensor 57. The BCM 50 can determine the locations and angles of the edges or surfaces based on a predetermined relationship between locations and angles in the image and locations and angles of edges in a predetermined guideloop position profile. The BCM 50 determines the seat position relative to the first retractor 22 (and the second retractor 24 if present) based on a comparison between the image and the predetermined seat position profile.

The vehicle system 10 further includes a first ratchet sensor 66 and, if the second retractor 24 is present, a second ratchet sensor 68. The first ratchet sensor 66 detects a position of the first ratchet, indicating whether the first ratchet is engaged with the first control disc of the first retractor 22. If present, the second ratchet sensor 68 detects a position of the second ratchet, indicating whether the second ratchet is engaged with the second control disc of the second retractor 24. The first ratchet sensor 66 generates a first ratchet sensor (RS1) signal and the second ratchet sensor 68 generates a second ratchet sensor (RS2) signal. The RS1 signal and the RS2 signal are inputs to the BCM 50.

The BCM 50 may also generate a signal or control the user interface device 54 to display a message indicating that an automatic locking retractor (ALR) use error is present. The ALR use error may be present when one or both of the first and second retractors 22 and 24 are disengaged when they should be engaged (e.g., when a child restraint seat is present in the seat 14), or when one or both of the first and second retractors 22 and 24 are engaged when they should be disengaged (e.g., when the occupant is seated on the seat 14 without a child restraint seat). The BCM 50 determines whether the ALR use error is present based on the RS1 signal and the RS2 signal.

The BCM 50 may control a speed of the vehicle based on the RS1 signal and the RS2 signal. For example, the BCM 50 determines that the ALR use error is present when one of the first retractor 22 and the second retractor 24 is engaged (i.e., the first or second ratchet is engaged with the respective first or second control disc) and the other of the first retractor 22 and the second retractor 24 is disengaged (i.e., the first or second ratchet is disengaged from the respective first or second control disc). The BCM 50 communicates a warning, reduces the speed of the vehicle, or prevents the vehicle from moving when the ALR use error is identified. Alternatively, as another example, the BCM 50 determines that the ALR use error is present when the first retractor 22 is engaged while a large occupant is in the seat or when the first retractor 22 is not engaged while a child restraint seat is present.

The vehicle system 10 may also include one or more lower anchor and tethers for children (LATCH) sensors (not shown). The LATCH sensors detect whether clips of a child restraint seat are coupled to lower and/or upper anchors of the vehicle seat 14. The LATCH sensors may be near or integral with the lower and/or upper anchors.

The vehicle system 10 may also include one or more seatbelt proximity sensors (not shown). The seat belt proximity sensors detect the proximity of the seat belt 16 to the sensors using one or more radiofrequency identification (RFID) tags fixed to the seat belt 16. The BCM 50 may use the input from the seat belt proximity sensors to determine the routing of the seat belt 16.

Figure 2:
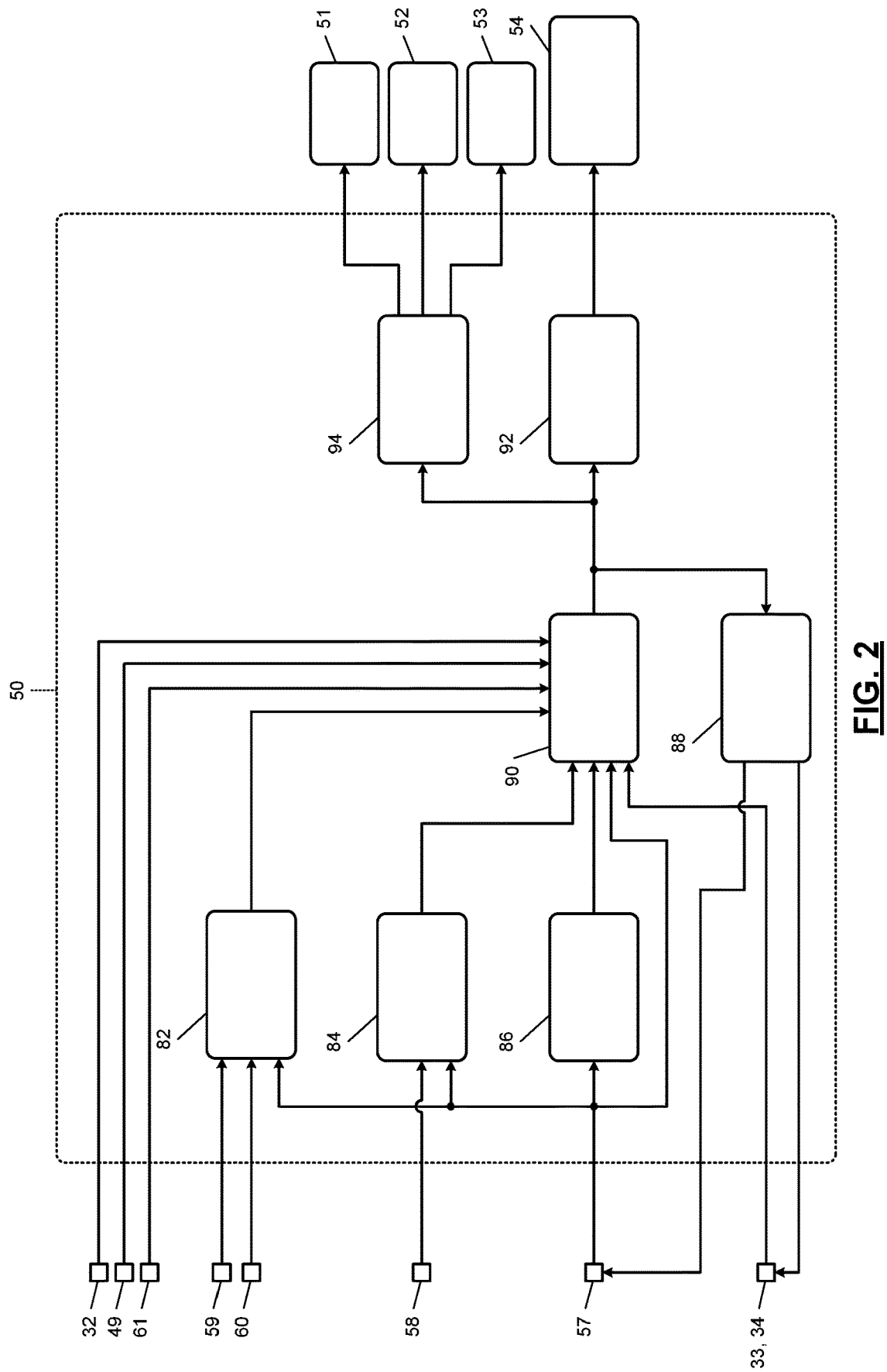
FIG. 2 is a functional block diagram of an example control system according to the present disclosure.

Referring now to FIG. 2, an example implementation of the BCM 50 includes a seat position module 82, an occupant detection module 84, an occupant posture module 86, a sensor state module 88, a seat belt routing module 90, and a user interface device (UID) control module 92. The seat position module 82 determines the position of the seat 14. The seat position module 82 may determine the fore-aft or longitudinal position of the seat bottom 64, the vertical position of the seat bottom 64, the angle of the seat bottom 64, and/or the angle of the seat back 62 relative to the seat bottom 64.

The seat position module 82 may determine the angle of the seat back 62 relative to the seat bottom 64 based on the BKP signal from the seat back position sensor 59. The seat position module 82 may determine the fore-aft or longitudinal position of the seat bottom 64 relative to the second retractor 24 or a certain location on the vehicle body based on the BMP signal from the seat bottom position sensor 60. Additionally or alternatively, the seat position module 82 may use the BMP signal to determine the vertical position of the seat bottom 64 relative to the floor of the vehicle body and/or the angle of the seat bottom 64 relative to a horizontal plane.

In addition to or instead of using the seat position sensors 59, 60 to determine seat position, the seat position module 82 may use the in-cabin sensor 57 to determine seat position. For example, the seat position module 82 may detect edges of the seat back 62 and the seat bottom 64, or portions of surfaces of the seat back 62 and the seat bottom 64, in an image from the in-cabin sensor 57. The seat position module 82 may determine the locations and angles of the edges or surfaces based on a predetermined relationship between locations and angles in the image and locations and angles of edges in a predetermined seat position profile. The seat position module 82 may determine the seat position based on a comparison between the image and the predetermined seat position profile.

The occupant detection module 84 detects whether an occupant, a child restraint seat, or another object is present in the seat 14. The occupant detection module 84 may detect whether an occupant, a child restraint seat, or another object is present in the seat 14 based on the input from the occupant detection device 58. Additionally or alternatively, the occupant detection module 84 may detect whether an occupant, a child restraint seat, or another object is present in the seat 14 based on an input from the in-cabin sensor 57. The occupant detection module 84 may be able to distinguish between an occupant, a child restraint seat, and another object, as well as be able to determine a child restraint seat type and an occupant size. In addition, the occupant detection module 84 may be able to detect seat belt routing paths on or through child restraint seats if they are visible to the in-cabin sensor 57.

In one example, the occupant detection module 84 detects, in an image from the in-cabin sensors 57, edges of an object in the seat 14, and the occupant detection module 84 uses the edges to determine the size, shape, and/or location of the object. The occupant detection module 84 may determine that the object is an occupant when the size of the object falls within a predetermined range for the size of the occupant and/or the shape of the object corresponds to a predetermined shape of an occupant. Additionally or alternatively, the occupant detection module 84 may determine that the object is an occupant when the location of the object corresponds to a predetermined location of an occupant.

The occupant posture module 86 determines the posture of an occupant in the seat 14 based on the input from the in-cabin sensor 57. For example, the occupant posture module 86 may detect edges of objects in the image captured by the in-cabin sensors 57, and use those edges to identify the shape, size, and/or relative location of the objects. The occupant posture module 86 may then determine whether those objects correspond to certain skeletal features (e.g., head, neck, shoulder, spine, arms, legs) or facial features (e.g., eye, nose, chin, mouth, ear) based on the shape, size, and/or relative locations of the objects. For example, the occupant posture module 86 may determine that an object is a certain skeletal feature of an occupant in the seat 14 when the shape of the object corresponds to a predetermined shape window, the size of the object corresponds to a predetermined size range, and/or the location of the object corresponds to a predetermined location range. The occupant posture module 86 may store a predetermined shape window, a predetermined size range, and a predetermined location range for each type of skeletal or facial feature identified in the image.

Once the occupant posture module 86 has identified the skeletal features of an occupant in the seat 14, the occupant posture module 86 may determine the posture of the occupant based on the size and relative locations of those features. For example, the occupant posture module 86 may determine the height of the occupant based on the size of the skeletal features or location of the facial features, and then assess the posture of the occupant based on the occupant height and one or more distances between the skeletal features or distances of the facial features from the seating surface. In one example, the occupant posture module 86 determines that the posture of the occupant is non-erect (e.g., the occupant is slouching) when the distance between the head and waist or upper legs of the occupant is less than a predetermined distance.

The sensor state module 88 wakes up or activates the shoulder webbing payout sensor 33, the lap webbing payout sensor 34 (if present), and/or the in-cabin sensor 57 at certain times to monitor the routing of the seat belt 16. The sensor state module 88 may wake up the shoulder webbing payout sensor 33, the lap webbing payout sensor 34 (if present), and/or the in-cabin sensor 57 by connecting a power supply (not shown) thereto. The sensor state module 88 hibernates or deactivates the shoulder webbing payout sensor 33, the lab webbing payout sensor 34 (if present) and/or the in-cabin sensor 57 at other times to conserve power. The sensor state module 88 may hibernate the shoulder webbing payout sensor 33, the lap webbing payout sensor 34 (if present), and/or the in-cabin sensor 57 by disconnecting the power supply therefrom.

The seat belt routing module 90 determines the routing of the seat belt 16 based on the inputs from the shoulder webbing payout sensor 33, the lap webbing payout sensor 34 (if present), and the in-cabin sensor 57. The seat belt routing module 90 may store a relationship between webbing payouts and seat belt routing, and determine the seat belt routing in a one-dimensional space based on the inputs from the webbing payout sensor(s) 33 (and 34 if present) using the stored relationship. For example, the seat belt routing module 90 may identify a particular seat belt routing when the webbing payouts correspond to predetermined ranges over time-based corridors for that seat belt routing. The seat belt routing module 90 may adjust the stored relationship between webbing payouts and seat belt routing to account for various factors that may affect this relationship. These factors may include an occupant in the vehicle seat 14 having a non-erect posture, the occurrence of a rapid braking event, an occupant in the vehicle seat 14 re-buckling a seat belt 16, a child restraint seat in the vehicle seat 14, the vehicle seat 14 being moved, and/or the guideloop 31 being moved.

The seat belt routing module 90 may store a unique webbing payout range or time-payout history corridor or characteristic for each possible seat belt routing. Alternatively, the webbing payout ranges for the possible seat belt routings may overlap, and the seat belt routing module 90 may determine that the measured seat webbing payouts correspond to more than one seat belt routing. In this latter case, the seat belt routing module 90 may assign a confidence to each of the possible seat belt routings. The possible shoulder webbing routings include across the chest and over the shoulder, across the chest and off the shoulder, across the chest and under the arm, on the wrong side of the head and down the chest to the buckle, and behind the back. The possible lap webbing routings include over the lap or waist and under the lap. Other possible seat belt routings include the seat belt 16 being stowed (i.e., retracted into the first retractor 22 and, if present, the second retractor 24) and the seat belt 16 being properly or improperly routed around a child restraint seat.

The seat belt routing module 90 also determines the routing of the seat belt 16 based on the inputs from the in-cabin sensors 57. In one example, the seat belt routing module 90 detects edges or surfaces of objects within the fields of view of the in-cabin sensors 57, and determines the size, shape, and location of those objects based on the detected edges and surfaces. The seat belt routing module 90 then determines whether one or more of the objects correspond to the shoulder webbing 18 and/or the lap webbing 20 based on the size, shape, and location of the objects. For example, the seat belt routing module 90 may determine that an object in the image is the shoulder webbing 18 when the size of the object corresponds to a predetermined size range, the shape of the object corresponds to a predetermined shape window, and the location of the object corresponds to a predetermined location range. As another example, the seat belt routing module 90 may detect the routing guide 17 presence and determine if the shoulder webbing 18 passes through it. In another example, the seat belt routing module 90 may detect if the shoulder webbing 18 and lap webbing 20 has passed through a detected routing path in a child restraint seat.

If the seat belt routing module 90 determines that an object in the image corresponds to the shoulder webbing 18 and/or the lap webbing 20, the seat belt routing module 90 then uses the edges or surfaces of the object to assess the seat belt routing. When assessing the seatbelt routing, the seat belt routing module 90 may also use the location of skeletal or facial features of the occupant as determined by the occupant posture module 86 and/or the location of the shoulder webbing 18 and/or the lap webbing 20 passing through locations on a child restraint seat as determined by the occupant detection module 84. For example, the seat belt routing module 90 may determine whether the seat belt 16 is routed over the shoulder, off the shoulder, or under the arm based on the relative locations of the seat belt 16 and the shoulder or arm. As another example, the seat belt routing module 90 may determine whether seat belt 16 is routed through a pass-through or guideloop on a child restraint seat.

The seat belt routing module 90 may use the webbing payout sensor(s) 33 (and 34 if present) as the primary sensors for determining seat belt routing in certain conditions. In these conditions, the seat belt routing module 90 may use the in-cabin sensor 57 as a secondary sensor for affirming or confirming the seat belt routing determined using the webbing payout sensor(s) 33 (and 34 if present). The seat belt routing module 90 may use the in-cabin sensor 57 as the primary sensor for determining seat belt routing in other conditions. In these other conditions, the seat belt routing module 90 may use the webbing payout sensor(s) 33 (and 34 if present) as secondary sensors for affirming or confirming the seat belt routing determined using the in-cabin sensor 57.

The UID control module 92 controls the user interface device 54 to alert an occupant in the cabin 12, or personnel monitoring the ride outside the vehicle, when the seat belt 16 is not routed properly. The UID control module 92 may also control the user interface device 54 to alert the occupant, or personnel monitoring the ride outside the vehicle, of other conditions such as an excessive payout of the seat belt 16 when the seat belt 16 is stowed. The vehicle speed control module 94 may send a vehicle speed instruction to the ECM 51, the TCM 52, and/or the EBCM 53 to decrease the vehicle speed when the seat belt 16 is not routed properly.

Figure 3:
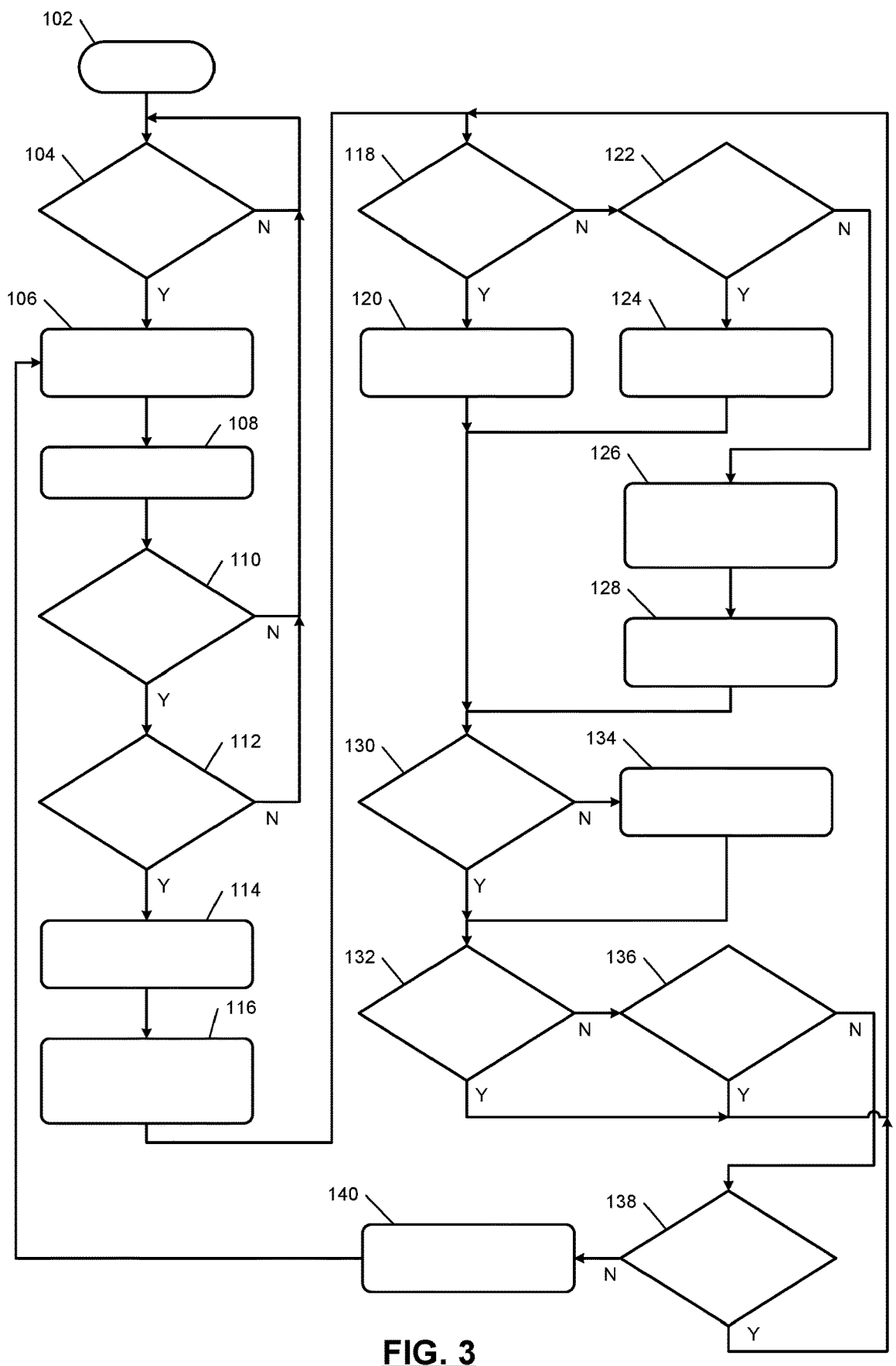
FIG. 3 is a flowchart illustrating a first example method for monitoring seat belt routing using both a webbing payout sensor and an in-cabin sensor.

Referring now to FIG. 3, a method for monitoring the routing of the seat belt 16 based on inputs from both the webbing payout sensor(s) 33 (and 34 if present) and the in-cabin sensor 57 begins at 102. At 104, the seat belt routing module 90 determines whether a ride has been initiated. For example, the seat belt routing module 90 may determine that a ride has been initiated when doors of the vehicle are shut, an ignition switch is adjusted to an on or start position, an ignition button is pressed, and/or a command to drive has been given. The seat belt routing module 90 may determine when the vehicle doors are shut based on an input from door position sensors (not shown). The seat belt routing module 90 may determine when an ignition switch or button is in an on position from an ignition switch position sensor (not shown). The seat belt routing module 90 may determine when a command to drive has been given by a drive status sensor (not shown). If a ride has been initiated, the method continues at 106. Otherwise, the seat belt routing module 90 continues to determine whether a ride has been initiated.

At 106, the shoulder webbing payout sensor 33 and the lap webbing payout sensor 34 (if present) monitor (e.g., repeatedly measure) the shoulder and lap webbing payouts, respectively. At 108, the buckle sensor 32 monitors (e.g., repeatedly detects) the buckle state of the seat belt 16. In other words, the buckle sensor 32 monitors whether the seat belt 16 is buckled or unbuckled.

At 110, the sensor state module 88 determines whether a change in the shoulder and/or lap webbing payout is greater than a first delta value. The first delta value may be a first predetermined difference between the current webbing payout and a stored length of the seat belt 16 at its minimum payout length when the seat belt 16 is first worn by an occupant or when the seat belt 16 is first routed around a child restraint seat. If the webbing payout change is greater than the first delta value, the method continues at 112. Otherwise, the method returns to 104.

At 112, the sensor state module 88 determines whether the buckle state of the seat belt 16 has changed from unbuckled to buckled. If the buckle state of the seat belt 16 has changed to buckled, the method continues at 114. Otherwise, the method returns to 104.

At 114, the sensor state module 88 wakes up the in-cabin sensors 57. At 116, the seat belt routing module 90 monitors the seat belt routing using the in-cabin sensors 57. At 118, the seat belt routing module 90 determines whether the seat belt routing determined using the in-cabin sensors 57 affirms the seat belt routing determined from the webbing payouts or payout time histories measured by the webbing payout sensor(s) 33 (and 34 if used). In one example, the seat belt routing can be more accurately detected by the in-cabin sensors 57 than the webbing payout sensor(s) 33 (and 34 if used). In this case, the seat belt routing module 90 identifies a plurality of possible seat belt routings based on the webbing payouts or payout time histories. If the seat belt routing determined using the in-cabin sensors 57 corresponds to any one of the possible seat belt routings, the seat belt routing determined using the in-cabin sensors 57 affirms seat belt routing determined from the webbing payouts or payout time histories measured by the webbing payout sensor(s) 33 (and 34 if used). If the seat belt routing determined using the in-cabin sensors 57 affirms the seat belt routing determined from the webbing payouts or payout time histories, the method continues at 120. Otherwise, the method continues at 122. At 120, the seat belt routing module 90 stores the seat belt routing determined using the in-cabin sensors 57 as the current seat belt routing, and the method continues at 130.

At 122, the seat belt routing module 90 determines whether the seat belt routing determined from the webbing payouts or payout time histories measured by the webbing payout sensor(s) 33 (and 34 if used) affirm the seat belt routing determined using the in-cabin sensors 57. In one example, the seat belt routing can be more accurately detected by the in-cabin sensors 57 than the webbing payout sensor(s) 33 (and 34 if used). In this case, the seat belt routing module 90 determines the seat belt routing based on the webbing payouts measured by the webbing payout sensor(s) 33 (and 34 if used) and identifies a plurality of possible seat belt routings based on the input from the in-cabin sensors 57. If the seat belt routing determined using the webbing payout sensor(s) 33 (and 34 if used) corresponds to any one of the possible seat belt routings, the seat belt routing determined from the webbing payouts or payout time histories measured by the webbing payout sensor(s) 33 (and 34 if present) affirm the seat belt routing determined using the in-cabin sensors 57. If the webbing payouts measured by the webbing payout sensor(s) 33 (and 34 if present) affirm the seat belt routing determined using the in-cabin sensors 57, the method continues at 124. Otherwise, the method continues at 126. At 124, the seat belt routing module 90 stores the seat belt routing determined using the webbing payout sensor(s) 33 (and 34 if present) as the current seat belt routing, and the method continues at 130.

At 126, the seat belt routing module 90 selects either the webbing payout sensor(s) 33 (and 34 if present) or the in-cabin sensors 57 as primary sensors for determining seat belt routing. The seat belt routing module 90 may make the selection based on the seat belt routing(s) determined using the webbing payout sensor(s) 33 (and 34 if present) and/or the in-cabin sensors 57. A confidence level for a determined seat belt routing can be calculated for each sensor type, and the sensor type with the highest confidence level can be selected, as described in connection with the methods of FIGS. 5A and 5B. Additionally or alternatively, the seat belt routing module 90 may make the selection based on whether the field of view of the in-cabin sensors 57 is partially or fully obstructed or obscured. The seat belt routing module 90 stores the seat belt routing determined using whichever one of (i) the webbing payout sensor(s) 33 (and 34 if present) and (ii) the in-cabin sensors 57 that is selected as the primary sensors.

In one example, the seat belt routing module 90 selects the webbing payout sensor(s) 33 (and 34 if present) as the primary sensors for determining the routing of the lap webbing 20 in any condition. In another example, the seat belt routing module 90 selects the webbing payout sensor(s) 33 (and 34 if present) as the primary sensor(s) for determining the routing of the shoulder webbing 18 when the field of view of the in-cabin sensors 57 is partially or fully obscured. In another example, the seat belt routing module 90 selects the webbing payout sensor(s) 33 (and 34 if present) as the primary sensors for determining the routing of the shoulder webbing 18 when the in-cabin sensors 57 are hibernated.

In another example, the seat belt routing module 90 selects the in-cabin sensors 57 as the primary sensors for determining the shoulder webbing routing when the webbing payout sensor(s) 33 (and 34 if present) indicate that any one of a plurality of shoulder webbing routings are possible, and the shoulder webbing routings cannot be reliably distinguished from each other using the webbing payout sensor (s) 33 (and 34 if present). The plurality of shoulder webbing routings include across the chest and over the shoulder, across the chest and off the shoulder (e.g., to one side of the shoulder), on the wrong side of the head and down the chest to the buckle, and across the chest and under the arm. In another example, the seat belt routing module 90 selects the in-cabin sensors 57 as the primary sensors for determining the point in time when the relationship between the webbing payout and the seat belt routing should be stored, such as when the seat belt 16 is at its minimum payout length when worn by an occupant or when routed around a child restraint seat. In yet another example, the seat belt routing module 90 selects the in-cabin sensors 57 as the primary sensors for determining whether the seat belt 16 is routed through the routing guide 17 or has passed through a detected routing path or slot in a child restraint seat.

In another example, the seat belt routing module 90 selects the in-cabin sensors 57 as the primary sensors for confirming that additional slack has been introduced by, for example, clipping the shoulder webbing 18 to or against the interior trim or vehicle structure or by holding the seat belt 16 away from the body with a hand or by placing an object between the body and the seat belt 16. In another example, the seat belt routing module 90 selects the in-cabin sensors 57 as the primary sensors for determining whether the seat belt 16 has been routed over routing guides of a child restraint seat rather than through the routing guides. In another example, seat belt routing module 90 selects the in-cabin sensors 57 as the primary sensors for determining the shoulder webbing routing when the posture of an occupant in the seat 14 is non erect.

In another example, the seat belt routing module 90 selects the in-cabin sensors 57 as the primary sensors for affirming that the seat belt 16 has been hand tightened by an occupant in the cabin 12. In another example, the seat belt routing module 90 selects the in-cabin sensors 57 as the primary sensors for determining the seat belt routing used to adjust the stored relationship between the webbing payout and the seat belt routing after a rapid breaking event. In another example, the seat belt routing module 90 selects the in-cabin sensors 57 as the primary sensors for affirming when the seat belt 16 is properly stowed.

At 128, the seat belt routing module 90 adjusts a seat belt routing classification of one or more secondary sensors used by the seat belt routing module 90 to determine seat belt routing. The secondary sensors may be the one of (i) the webbing payout sensor(s) 33 (and 34 if present) and (ii) the in-cabin sensors 57 that are not selected as the primary sensors. For example, if the seat belt routing module 90 selects the webbing payout sensor(s) 33 (and 34 if present) as the primary sensor(s), the in-cabin sensors 57 may be the secondary sensors. In another example, if the seat belt routing module 90 selects the in-cabin sensors 57 as the primary sensors, the webbing payout sensor 33 (and 34 if present) may be the secondary sensor(s).

The seat belt routing classification may be a relationship between the input from the secondary sensors and the seat belt routing. For example, if the webbing payout sensor(s) 33 (and 34 if present) are the secondary sensors, the seat belt routing classification of the webbing payout sensor(s) 33 (and 34 if present) may be the stored relationship(s) between the webbing payout(s) and the seat belt routing. Thus, at 128, the seat belt routing module 90 may adjust the stored relationship(s) so that the seat belt routing determined using the webbing payout sensor(s) 33 (and 34 if present) corresponds to the seat belt routing determined using the in-cabin sensors 57.

At 130, the seat belt routing module 90 determines whether the stored (or current) seat belt routing is proper. The routing of the shoulder webbing 18 is proper when the shoulder webbing 18 is routed across the chest of an occupant in the seat 14 and over the shoulder of the occupant. The routing of the lap webbing 20 is proper for an occupant in the seat 14 without a child restraint seat when the lap webbing 20 is routed over the lap or waist of the occupant. The routing of the lap webbing 20 is proper for a child restraint seat when the lap webbing 20 is routed through the routing guides on the child restraint seat. If the stored seat belt routing is proper, the method continues at 132. Otherwise, the method continues at 134. At 134, the UID control module 92 controls the user interface device 54 to indicate that the seat belt 16 is routed improperly.

At 132, the sensor state module 88 determines whether, after the seat belt routing is initially determined and stored, a change in the shoulder webbing payout and/or the lap webbing payout as measured by the webbing payout sensor(s) 33 (and 34 if present) is greater than a second delta value. The second delta value may be a second predetermined difference between the current webbing payout and the stored length of the seat belt 16 at its minimum payout length when the seat belt 16 is first worn by an occupant or when the seat belt 16 is first routed around a child restraint seat. The second delta value may be less than, greater than, or equal to the first delta value. If the change in the shoulder webbing payout and/or the lap webbing payout is greater than the second delta value, the method returns to 118. Otherwise, the method continues at 136.

At 136, the sensor state module 88 determines whether, after the seat belt routing is initially determined and stored, the seat belt routing changes. In making this determination, the sensor state module 88 may use the same one of (i) the webbing payout sensor(s) 33 (and 34 if present) and (ii) the in-cabin sensors 57 which was used to determine the stored seat belt routing. For example, if the webbing payout sensor(s) 33 (and 34 if present) were used to determine the stored seat belt routing, at 136, the sensor state module 88 may determine whether the seat belt routing determined using the webbing payout sensor(s) 33 (and 34 if present) has changed. Conversely, if the in-cabin sensors 57 were used to determine the stored seat belt routing, at 136, the sensor state module 88 may determine whether the seat belt routing determined using the in-cabin sensors 57 has changed. If the seat belt routing has changed, the method returns to 118. Otherwise, the method continues at 138.

At 138, the sensor state module 88 determines whether the buckle state of the seat belt 16 has changed from unbuckled to buckled or from buckled to unbuckled. In other words, the sensor state module 88 determines whether an occupant has unbuckled or buckled the seat belt 16 during a ride. If the buckle state of the seat belt 16 has changed from unbuckled to buckled or from buckled to unbuckled, the method returns to 118. Otherwise, the method continues at 140. At 140, the sensor state module 88 hibernates the in-cabin sensors 57 since the state of the seat belt 16 appears to be unchanging, and the method returns to 106.

Various modifications can be made to the method of FIG. 3 within the scope of the present disclosure. For example, one or more (e.g., all) of 110, 112, 114, 132, 136, and 138 may be omitted, and the in-cabin sensors 57 may be activated throughout the entire method of FIG. 3. In one example, the method may continue directly to 116 from 108, and in another example, the method may continue directly to 106 from 130 and 134.

In another example, the order of 118 and 122 may be reversed. More specifically, after 116, the method may continue at 122. If 122 is true, the method may continue at 124. If 122 is false, the method may continue at 118. If 118 is true, the method may continue at 120. If 118 is false, the method may continue at 126. The rest of the method of FIG. 3 may be the same as described above.

Figure 4:
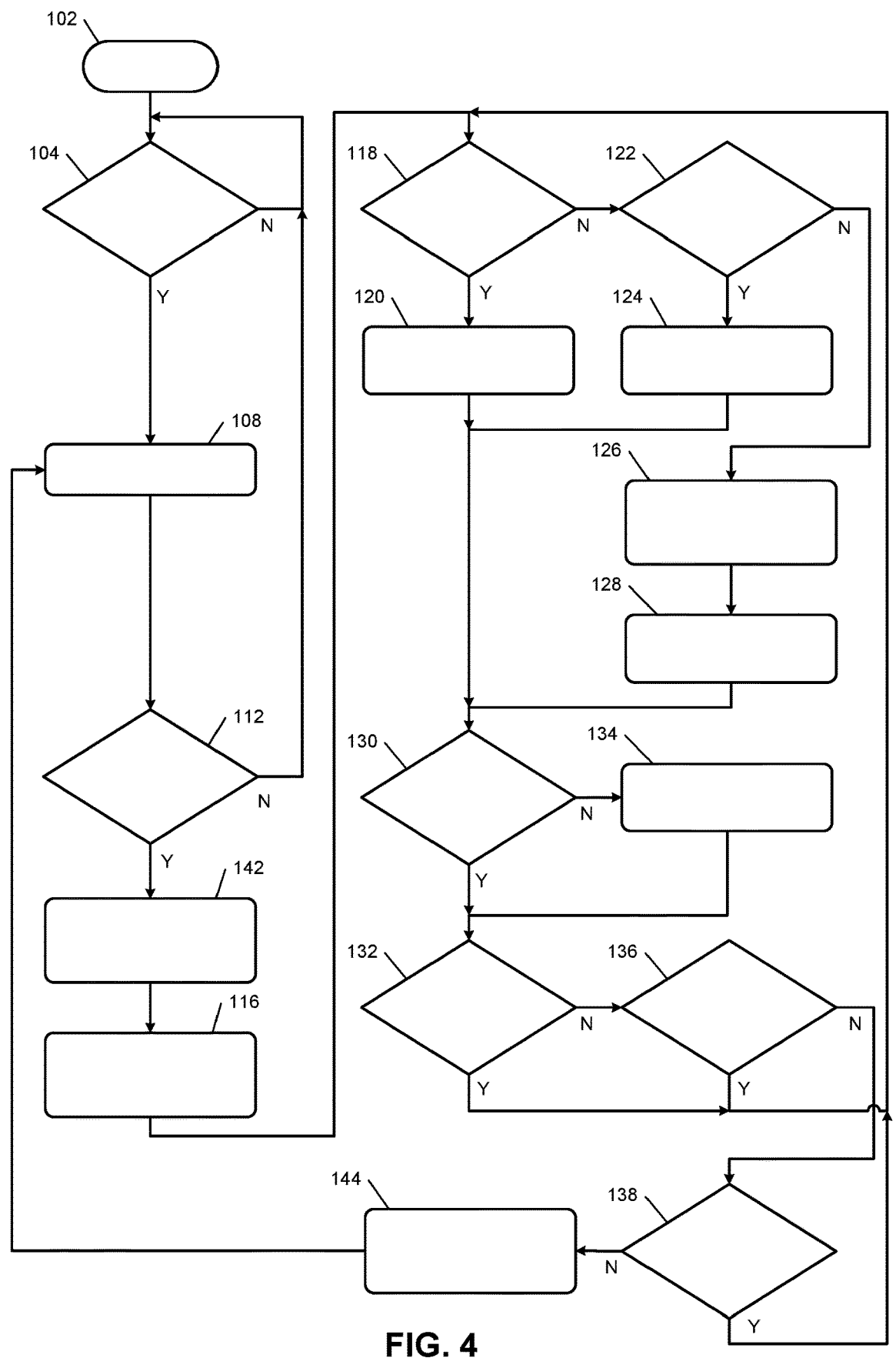
FIG. 4 is a flowchart illustrating a second example method for monitoring seat belt routing using both a webbing payout sensor and an in-cabin sensor.

Referring now to FIG. 4, another variation of the method of FIG. 3 is illustrated. In this variation, 106 and 110 have been omitted, and 114 and 140 have been replaced with one 42 and 144, respectively. Otherwise, the method of FIG. 4 is identical to the method of FIG. 3.

At 142, the sensor state module wakes up both the webbing payout sensor(s) 33 (and 34 if present) and the in-cabin sensors 57. At 144, the sensor state module 88 hibernates both the webbing payout sensor(s) 33 (and 34 if present) and the in-cabin sensors 57. Thus, in the method of FIG. 4, the sensor state module 88 wakes up and hibernates both the webbing payout sensor(s) 33 (and 34 if present) and the in-cabin sensors 57. This is the main difference between the method of FIG. 4 and the method of FIG. 3 since, in the method of FIG. 3, the sensor state module 88 wakes up and hibernates only the in-cabin sensors 57.

Figure 5A:
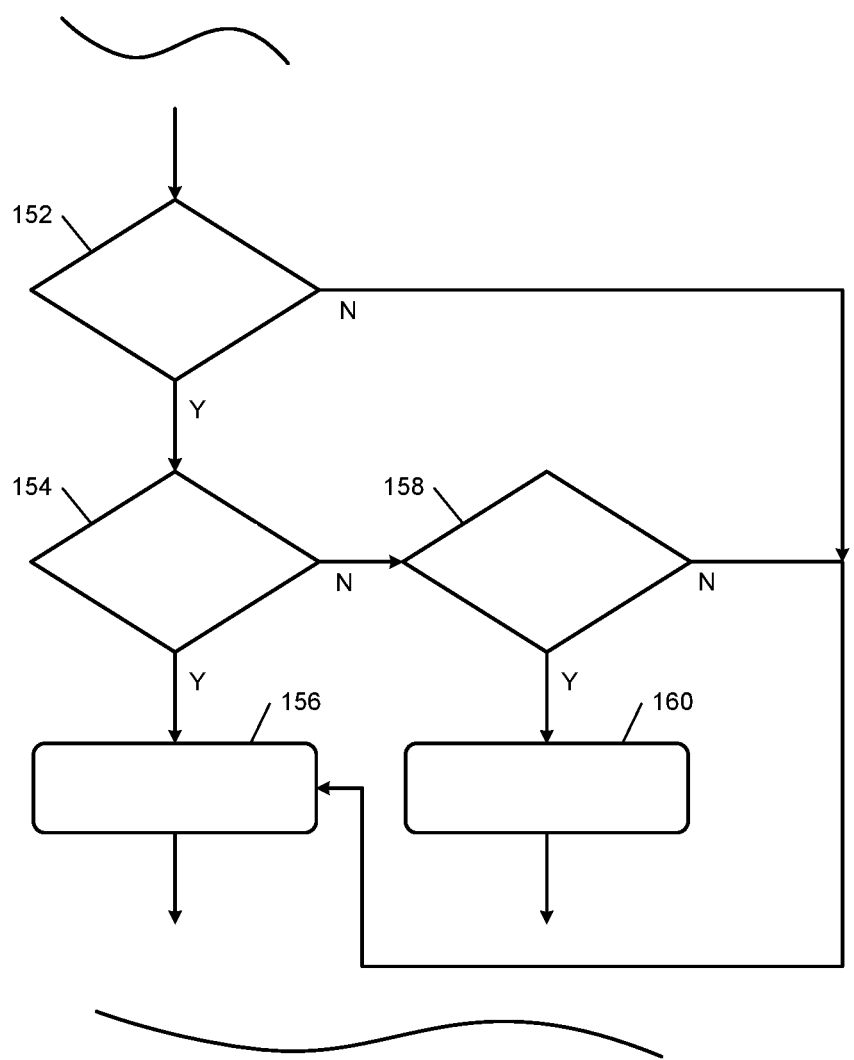
FIGS. 5A and 5B are flowcharts illustrating example methods for selecting one of a webbing payout sensor and an in-cabin sensor as a primary sensor for monitoring seat belt routing.

Referring now to FIG. 5A, a method for selecting one of (i) the webbing payout sensor(s) 33 (and 34 if present) and (ii) the in-cabin sensors 57 as the primary sensors is illustrated. The method of FIG. 5A may be executed at 126 of FIG. 3 or 4. At 152, the seat belt routing module 90 determines whether the in-cabin sensors 57 detect the shoulder webbing 18. If the in-cabin sensors 57 detect the shoulder webbing 18, the method continues at 154. Otherwise, the method continues at 156. At 156, seat belt routing module 90 selects the webbing payout sensor(s) 33 (and 34 if present) as the primary sensors for determining the seat belt routing.

At 154, the seat belt routing module 90 determines whether the confidence of the seat belt routing determined using the shoulder webbing payout sensor 33 and/or the lap webbing payout sensor 34 is greater than a first percentage. The first percentage may be predetermined. If the confidence of the seat belt routing determined using the webbing payout sensor(s) 33 and/or 34 is greater than the first percentage, the method continues at 156. Otherwise, the method continues at 158.

When determining the seat belt routing based on the input from the webbing payout sensor(s) 33 (and 34 if present), the seat belt routing module 90 may assign a confidence (e.g., a percentage) to each of the possible seat belt routings based on various factors. For example, the seat belt routing module 90 may assign a high confidence to all of the possible lap webbing routings when determining the lap webbing routing using the webbing payout sensor(s) 33 (and 34 if present) in any condition. In another example, the seat belt routing module 90 may assign a low confidence to all of the possible shoulder webbing routings when determining the shoulder webbing routings using the webbing payout sensor(s) 33 (and 34 if present) if the seat belt routing determined using the in-cabin sensors 57 is improper. The seat belt routing module 90 may select the one(s) of the possible seat belt routings that has/have the highest confidence, and compare that confidence to the first percentage at 154.

At 158, the seat belt routing module 90 determines whether the confidence of the seat belt routing determined using the in-cabin sensors 57 is greater than a second percentage. The second percentage may be the same as the first percentage and/or may be predetermined. If the confidence of the seat belt routing determined using the in-cabin sensors 57 is greater than the second percentage, the method continues at 160. Otherwise, the method continues at 156. At 160, the seat belt routing module 90 selects the in-cabin sensors 57 as the primary sensors for determining the seat belt routing.

When determining the seat belt routing based on the input from the in-cabin sensors 57, the seat belt routing module 90 may assign a confidence (e.g., a percentage) to each of the possible seat belt routings based on various factors. For example, the seat belt routing module 90 may assign a low confidence to all of the possible seat belt routings when determining the seat belt routing using the in-cabin sensors 57 if the field-of-view of the in-cabin sensors 57 is partially or fully obscured. In another example, seat belt routing module 90 may assign a high confidence to all of the possible improper shoulder webbing routings when determining the shoulder webbing routing using the in-cabin sensors 57. The possible improper shoulder webbing routings include across the chest off the shoulder, across the chest and under the arm, on the wrong side of the head and down the chest to the buckle, and behind the back. The seat belt routing module 90 may select the one(s) of the possible seat belt routings (determined using the in-cabin sensors 57) that has/have the highest confidence, and compare that confidence to the second percentage at 158.

Figure 5B:
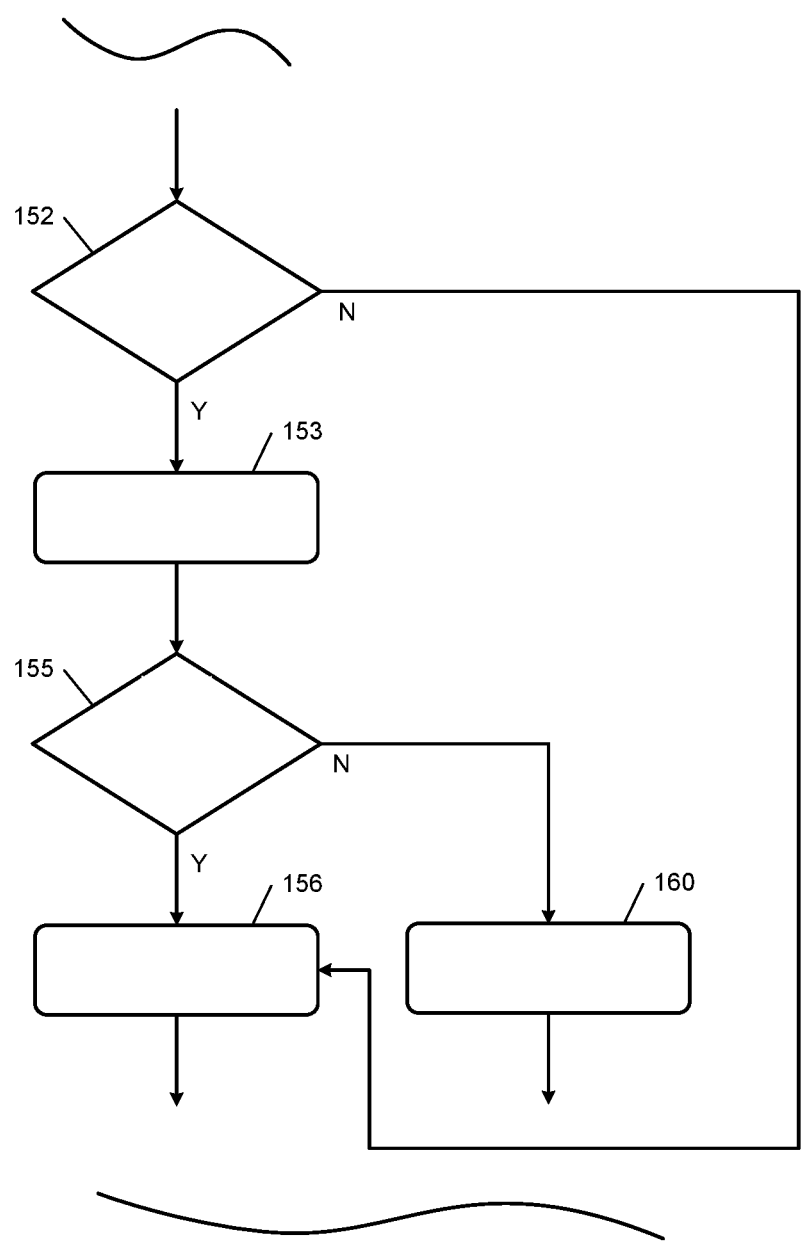

Referring now to FIG. 5B, another method for selecting one of (i) the webbing payout sensor(s) 33 (and 34 if present) and (ii) the in-cabin sensors 57 as the primary sensors is illustrated. The method of FIG. 5B may be executed at 126 of FIG. 3 or 4. The method of FIG. 5B is similar or identical to the method of FIG. 5A except that 154 and 158 of FIG. 5A have been replaced with 153 and 155. In addition, in the method of FIG. 5A, the seat belt routing module 90 assigns confidences to the seat belt routings determined using the webbing payout sensor(s) 33 (and 34 if present) and the in-cabin sensors 57, but this step is not shown on FIG. 5A. In contrast, this step is shown in FIG. 5B at 153.

At 152, the seat belt routing module 90 determines whether the in-cabin sensors 57 detect the shoulder webbing 18. If the in-cabin sensors 57 detect the shoulder webbing 18, the method continues at 153. Otherwise, the method continues at 156. At 156, seat belt routing module 90 selects the webbing payout sensor(s) 33 (and 34 if present) as the primary sensors for determining the seat belt routing.

At 153, the seat belt routing module 90 assigns a first confidence to the seat belt routing determined using the webbing payout sensor(s) 33 (and 34 if present) and assigns a second confidence to the seat belt routing determined using the in-cabin sensors 57. The seat belt routing module 90 may identify a plurality of possible seat belt routings based on the input from the webbing payout sensor(s) 33 (and 34 if present), and assign a confidence to each of these possible seat belt routings based on various factors as discussed above. The method may then set the first confidence equal to the highest one of the confidences for the possible seat belt routings identified based on the input from the webbing payout sensor(s) 33 (and 34 if present). Similarly, the seat belt routing module 90 may identify a plurality of possible seat belt routings based on the input from the in-cabin sensors 57, and assign a confidence to each of these possible seat belt routings based on various factors as discussed above. The method may then set the second confidence equal to the highest one of the confidences for the possible seat belt routings identified based on the input from the in-cabin sensors 57.

At 155, the seat belt routing module 90 determines whether the first confidence is greater than the second confidence. If the first confidence is greater than the second confidence, the method continues at 156. Otherwise, the method continues at 160. At 160, the seat belt routing module 90 selects the in-cabin sensors 57 as the primary sensors for determining the seat belt routing.

Figure 6:
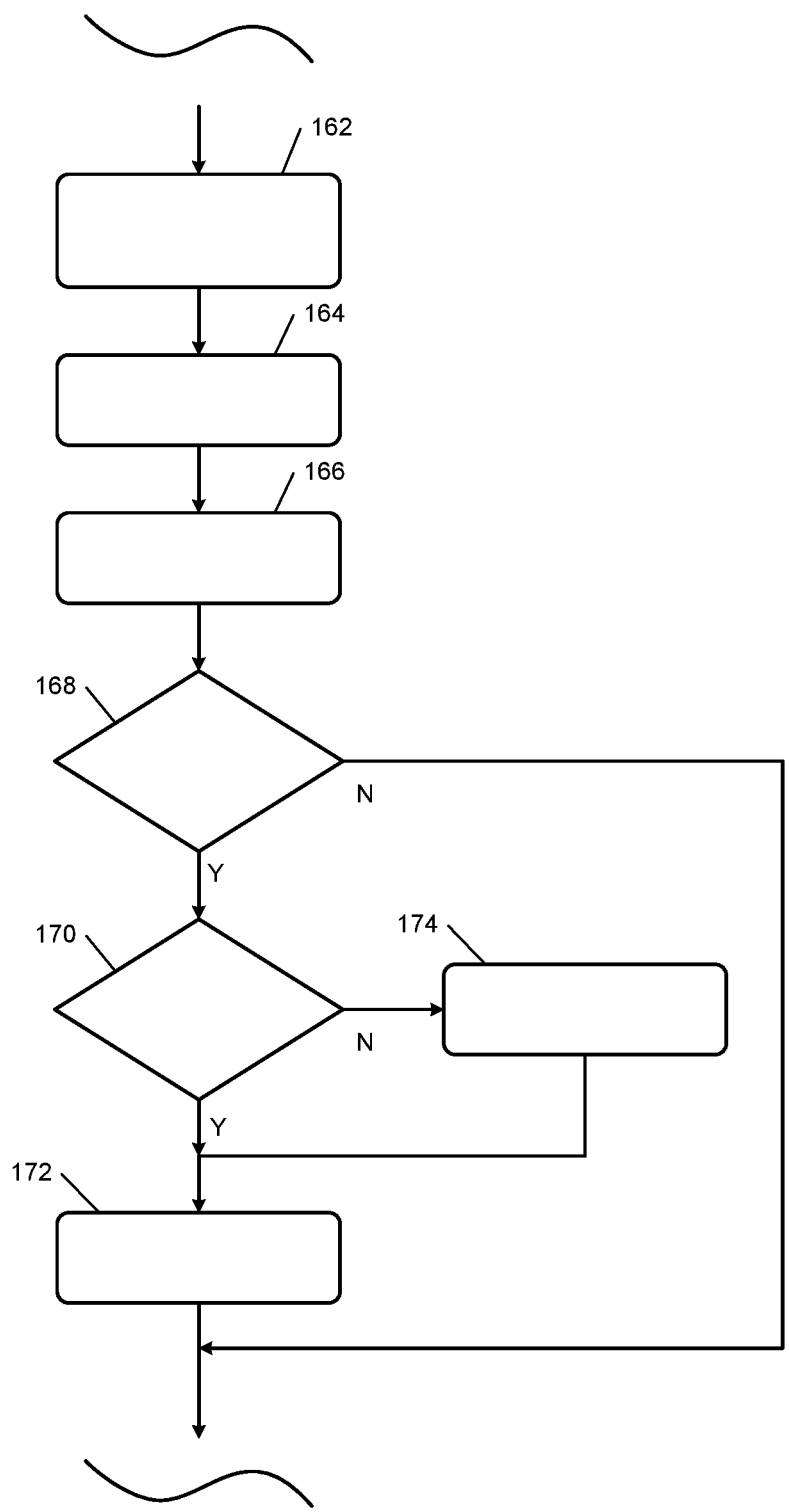
FIG. 6 is a flowchart illustrating an example method of accounting for changes in the posture of an occupant and a seat when monitoring seat belt routing.

Referring now to FIG. 6, method of accounting for the posture of an occupant in the seat 14 when monitoring the routing of the seat belt 16 is illustrated. The method of FIG. 6 may be executed in conjunction with either one of the methods of FIGS. 3 and 4. If the method of FIG. 6 is executed in conjunction with one of the methods of FIGS. 3 and 4, any steps in the method of FIG. 6 that are redundant with the steps in the methods of FIGS. 3 and 4 may be omitted.

At 162, the sensor state module 88 wakes up the in-cabin sensors 57 if the in-cabin sensors 57 are not already awake. 162 may be executed if a change in the shoulder and/or lap webbing payout is greater than a third delta value with respect to (i) the payout when the in-cabin sensors 57 were hibernated or (ii) a stored length of the seat belt 16 at its minimum payout length when it is first worn by an occupant or when it is first routed around a child restraint seat. At 164, the seat belt routing module 90 monitors the seat belt routing using the in-cabin sensors 57. At 166, the occupant posture module 86 monitors the posture of an occupant in the seat 14 based on the input from the in-cabin sensors 57.

At 168, the occupant posture module 86 determines whether the occupant posture is non-erect. If the occupant posture is non-erect, the method continues at 170. Otherwise, the method ends or continues to a step in the method of FIG. 3 or 4 (e.g., 108 or 132).

At 170, the seat belt routing module 90 determines whether the seat belt routing determined using the in-cabin sensors 57 affirms the occupant posture and the webbing payouts measured by the webbing payout sensor(s) 33 (and 34 if present). For example, the seat belt routing module 90 may determine whether the seat belt routing determined using the in-cabin sensors 57 corresponds to a seat belt routing determined using the webbing payout sensor(s) 33 (and 34 if present) when taking into account the non-erect occupant posture. In other words, the seat belt routing module 90 may confirm that a non-erect occupant posture is the reason that the seat belt routing determined using the webbing payout sensor(s) 33 (and 34 if present) is different than the seat belt routing using the in-cabin sensors 57.

If the seat belt routing determined using the in-cabin sensors 57 affirms the occupant posture and the webbing payouts, the method continues at 172. Otherwise, the methods continues at 174. At 174, the seat belt routing module 90 selects the in-cabin sensors 57 as the primary sensors. Thus, the seat belt routing module 90 selects the in-cabin sensors 57 as the primary sensors when the seat belt routing determined using the webbing payout sensor(s) 33 (and 34 if present) does not correspond to the seat belt routing determined using the in-cabin sensors 57, and non-erect occupant posture is not the reason for the discrepancy. At 172, the UID control module 92 controls the user interface device 54 to instruct the occupant to sit erect.

Figure 7:
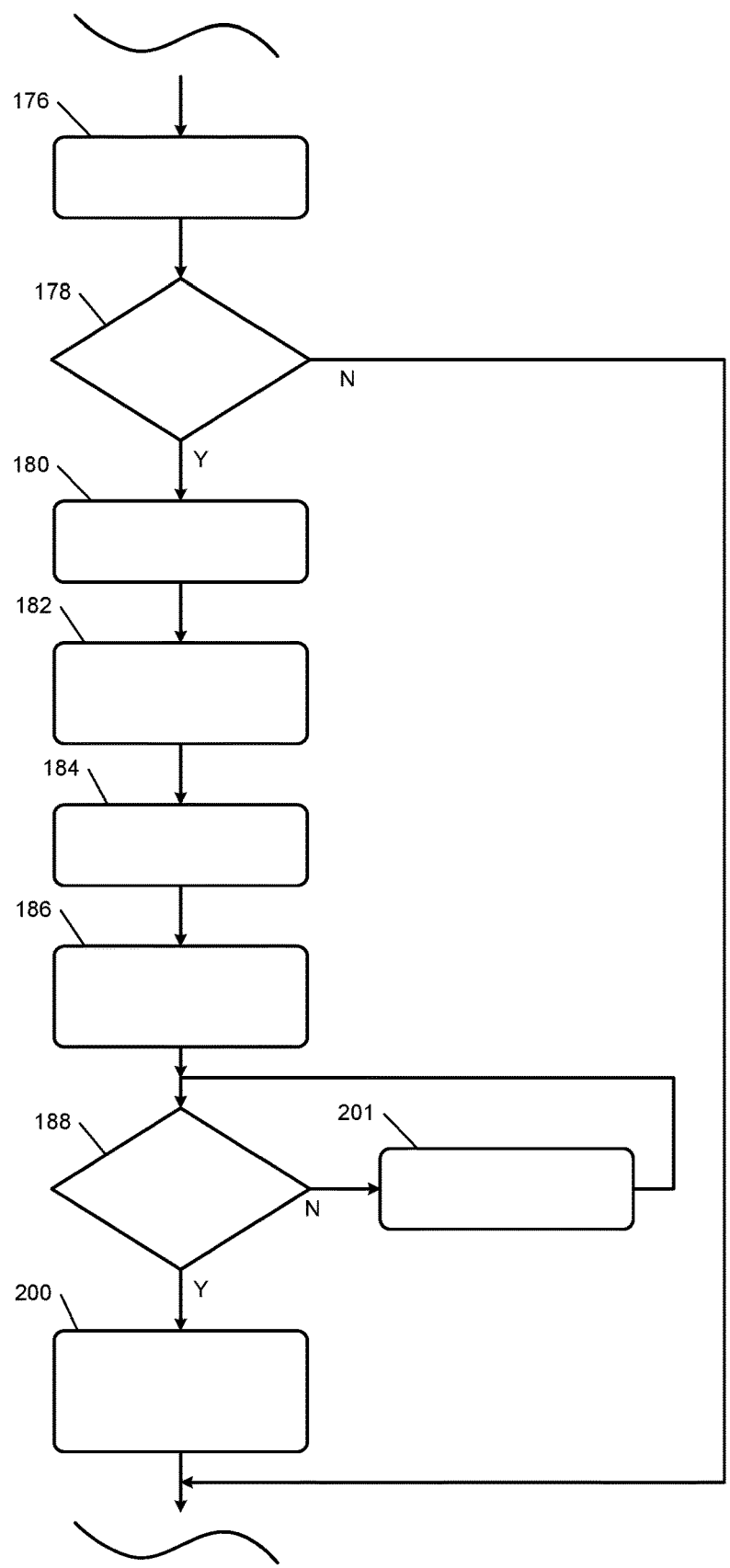
FIG. 7 is a flowchart illustrating an example method of accounting for changes in webbing payout due to rapid braking when monitoring seat belt routing.

Referring now to FIG. 7, a method of accounting for rapid braking events when monitoring the routing of the seat belt 16 is illustrated. The method of FIG. 7 may be executed in conjunction with either one of the methods of FIGS. 3 and 4. If the method of FIG. 7 is executed in conjunction with one of the methods of FIGS. 3 and 4, any steps in the method of FIG. 7 that are redundant with the steps in the methods of FIGS. 3 and 4 may be omitted.

At 176, the vehicle accelerometer 49 monitors (e.g., repeatedly measures) the acceleration of the vehicle. At 178, the seat belt routing module 90 determines whether a rapid braking event has occurred. The seat belt routing module 90 may determine that a rapid braking event has occurred when the vehicle decelerates at a rate that is greater than a predetermined rate, optionally for a predetermined period. If a rapid braking event has occurred, the method continues at 180. Otherwise, the method ends or continues to a step in the method of FIG. 3 or 4 (e.g., 116 or 132).

At 180, the sensor state module 88 wakes up the in-cabin sensors 57. At 182, the seat belt routing module 90 monitors the seat belt routing using the in-cabin sensors 57. At 184, the seat belt routing module 90 stores the seat belt routing determined using the in-cabin sensors 57. At 186, the occupant posture module 86 monitors the posture of an occupant in the seat 14 using the in-cabin sensors 57.

At 188, the occupant posture module 86 determines if the occupant posture is erect. If the occupant posture is erect, the method continues at 200. Otherwise, the method continues at 201. At 200, the seat belt routing module 90 adjusts the stored relationship between the webbing payouts measured using the webbing payout sensor(s) 33 (and 34 if present) and the seat belt routing. At 201, the UID control module 92 controls the user interface device 54 to instruct the occupant to sit erect, and then the occupant posture module 86 continues to determine if the posture is erect.

When a rapid braking event occurs, the torso of an occupant in the seat 14 translates into the shoulder webbing 18 and the lap webbing 20 due to the momentum of the occupant, which rapidly extracts the shoulder and lap webbings 18 and 20 from the first retractor 22 and the second retractor 24 (if present). In turn, the spool(s) in the first retractor 22 and the second retractor 24 (if present) lock up to prevent further extraction of the shoulder and lap webbings 18 and 20 from the first retractor 22 and the second retractor 24 (if present). As a result, the shoulder and lap webbings 18 and 20 become wound tighter around the spool(s), which decreases the shoulder and lap webbing payouts relative to the rotational position of the spool(s). Thus, the seat belt routing module 90 adjusts the stored relationship between the webbing payout and the seat belt routing to account for this change.

The seat belt routing module 90 may also store a relationship between (i) the rotational position of spools within the first and second retractors 22 and 24, and (ii) the payout of the shoulder and lap webbing's 18 and 20, respectively. The length or payout of the shoulder and lap webbings 18 and 20 that is stored at 200 may be referred to as stored static lengths. The stored static lengths may be the minimum webbing payout when the seat belt 16 is worn by the occupant in its currently routed configuration (e.g., across the chest and over the shoulder, across the chest and off the shoulder, across the chest and under the arm, behind the back). The new static stored lengths may replace the old stored static lengths determined in a time window after the seat belt 16 is buckled for the original seat belt configuration). After 200, the method ends or continues to a step in the method of FIG. 3 or 4 (e.g., 116 or 132).

Figure 8:
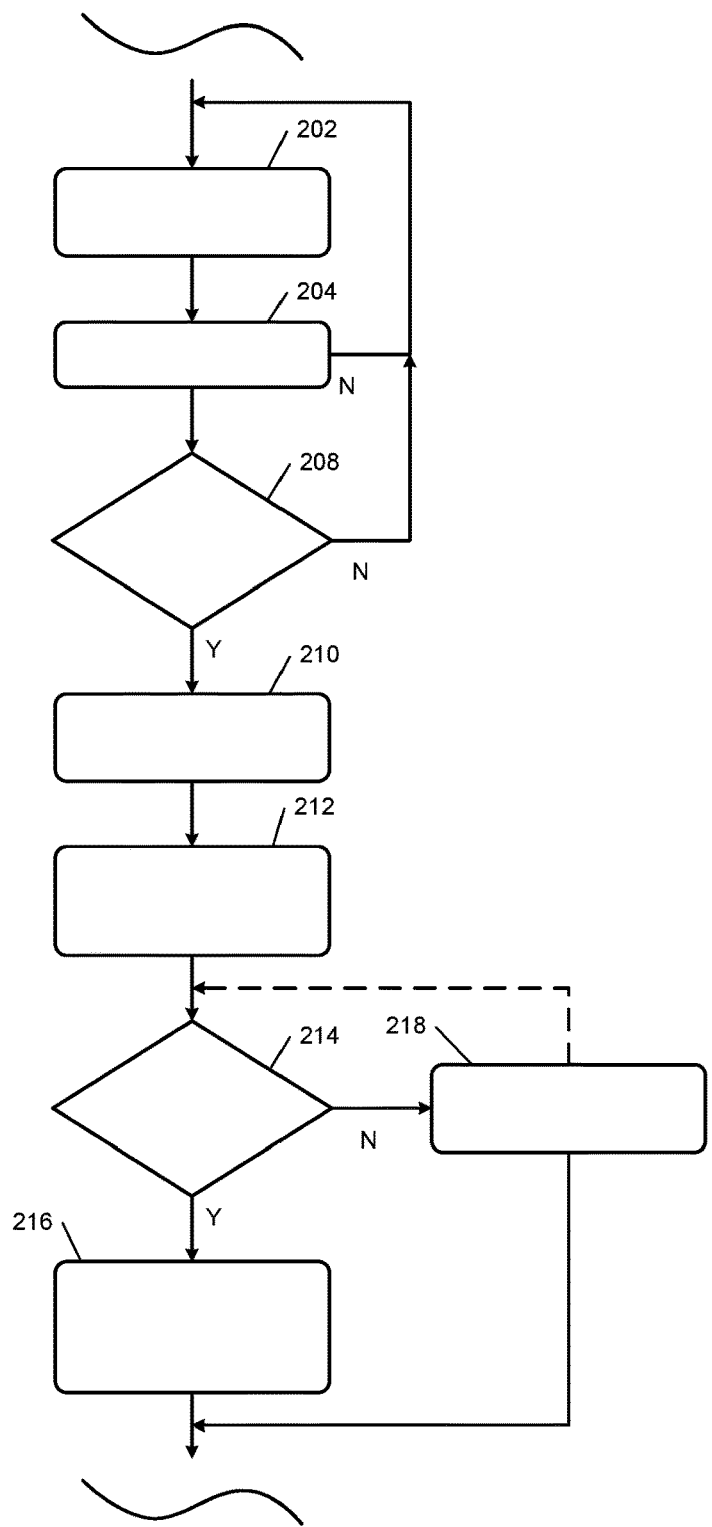
FIG. 8 is a flowchart illustrating an example method of accounting for an occupant rebuckling a seat belt during a ride when monitoring seat belt routing.

Referring now to FIG. 8, a method of accounting for an occupant re-buckling the seat belt 16 when monitoring the routing of the seat belt 16 is illustrated. The method of FIG. 8 may be executed in conjunction with either one of the methods of FIGS. 3 and 4. If the method of FIG. 8 is executed in conjunction with one of the methods of FIGS. 3 and 4, any steps in the method of FIG. 8 that are redundant with the steps in the methods of FIGS. 3 and 4 may be omitted.

At 202, the shoulder webbing payout sensor 33 and the lap webbing payout sensor 34 (if present) monitor (e.g., repeatedly measure) the payout of the shoulder and lap webbing 18 and 20, respectively. At 204, the buckle sensor 32 monitors the buckle state of the seat belt 16. In other words, the buckle sensor 32 repeatedly determines whether the seat belt 16 is buckled or unbuckled.

At 208, the sensor state module 88 determines whether the buckle state of the seat belt 16 has changed from unbuckled to buckled. If the buckle state of the seat belt 16 has changed from unbuckled to buckled, the method continues at 210. Otherwise, the method returns to 202.

At 210, the sensor state module 88 wakes up the in-cabin sensors 57. At 212, the seat belt routing module 90 monitors the seat belt routing using the in-cabin sensors 57. At 214, the seat belt routing module 90 determines whether the seat belt 16 is routed across the chest of an occupant in the seat 14 and over a shoulder of the occupant. The seat belt routing module 90 makes this determination based on the seat belt routing determined using the in-cabin sensors 57. If the seat belt 16 is routed across the chest and over the shoulder, a method continues at 216. Otherwise, the method continues at 218. At 218, the UID control module 92 controls the user interface device 54 to indicate that the seat belt 16 is routed improperly. After 218, the method may return to 214 (dashed arrow in FIG. 8) or end and/or continue to another step in FIG. 3 or 4.

At 216, the seat belt routing module 90 adjusts the stored relationship between the webbing payouts and the seat belt routing. Thus, each time an occupant in the seat 14 unbuckled and re-buckles the seat belt 16 during a ride, the seat belt routing module 90 adjust the stored relationship between the webbing payouts and the seat belt routing based on the input from the in-cabin sensors 57. This improves the accuracy of the seat belt routing determined using the webbing payout sensor(s) 33 (and 34 if present), which is especially beneficial when the in-cabin sensors 57 are hibernated.

In addition to or instead of adjusting the stored relationship between the webbing payouts and the seat belt routing at 216, the seat belt routing module 90 may reset the stored static lengths of the shoulder and lap webbings 18 and 20. After 216, the method ends and/or continues to another step in FIG. 3 or 4.

Figure 9:
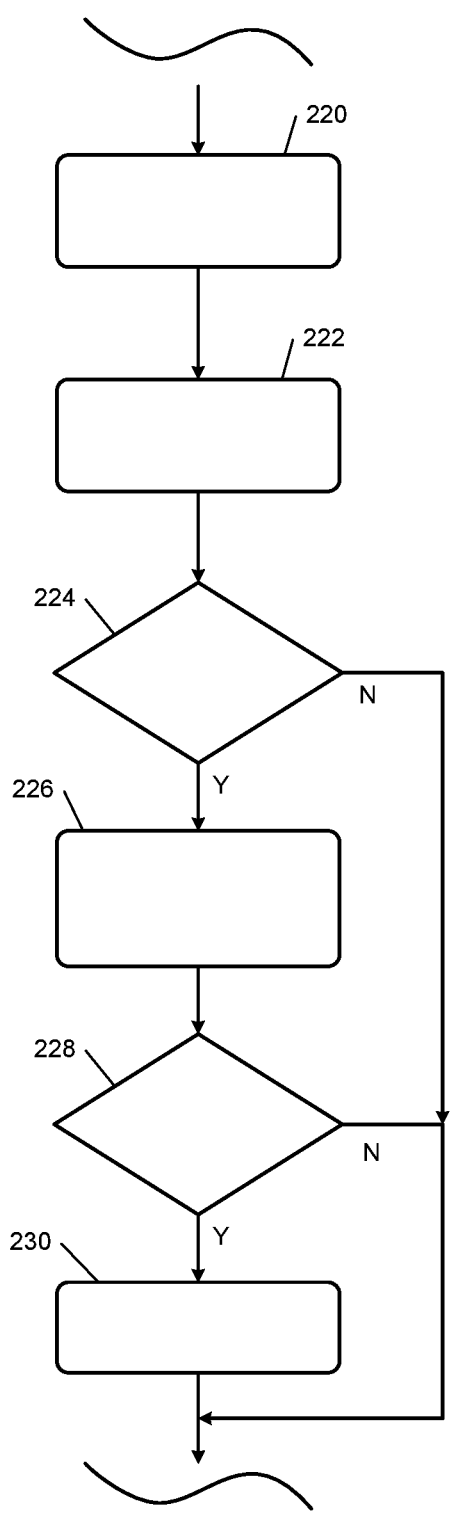
FIG. 9 is a flowchart illustrating an example method of adjusting a stored relationship between spool position and webbing payout when a seat belt is stowed.

Referring now to FIG. 9, illustrated is a method for adjusting a stored relationship between spool positions and webbing payouts when the seat belt 16 is stowed. The method of FIG. 9 may be executed in conjunction with either one of the methods of FIGS. 3 and 4. If the method of FIG. 9 is executed in conjunction with one of the methods of FIGS. 3 and 4, any steps in the method of FIG. 9 that are redundant with the steps in the methods of FIGS. 3 and 4 may be omitted.

At 220, the sensor state module 88 wakes up the in-cabin sensors 57 if the in-cabin sensors 57 are not already awake. 220 may be executed if a change in the shoulder and/or lap webbing payout is greater than a fourth delta value with respect to (i) the payout when the in-cabin sensors 57 were hibernated or (ii) a stored length of the seat belt 16 at its minimum payout length when it is first worn by an occupant or when it is first routed around a child restraint seat. At 222, the seat belt routing module 90 monitors the seat belt routing using the in-cabin sensors 57. At 224, the seat belt routing module 90 determines whether the seat belt routing determined using the in-cabin sensors 57 indicates that the seat belt 16 is stowed properly. For example, the seat belt routing module 90 may determine that the seat belt 16 is stowed properly when the shoulder webbing 18 and the lap webbing 20 extend in approximately a straight line along the seat back 62 or adjacent to the seat back 62. If the seat belt 16 is stowed properly, the method continues at 226. Otherwise, the method ends and/or continues to another step in the method of FIG. 3 or 4.

At 226, the seat belt routing module 90 adjust the stored relationship between the positions of the spools within the first retractor 22 and the second retractor 24 (if present) and the payouts of the shoulder and lap webbings 18 and 20, respectively. In one example, the seat belt routing module 90 stores the current spool position and the corresponding webbing payouts as the stowed webbing payout when the in-cabin sensors 57 indicate that the seat belt is properly stowed. The seat belt routing module 90 then adjusts the relationships between all of the other possible spool positions and webbing payout accordingly for other routing conditions, as the stowed webbing payout is used as a measured starting point for the payouts in the other routing conditions. Then, when the seat belt 16 is extracted, the seat belt routing module 90 can accurately determine the shoulder and lap webbing payouts based on the rotational positions of the spools within the first retractor 22 and the second retractor 24 (if present). The seat belt routing module 90 may then determine the seat belt routing based on the accurate webbing payout using this stowed webbing payout calibration technique.

At 228, the seat belt routing module 90 determines whether the shoulder webbing payout and/or the lap webbing payout is greater than a first amount. The first amount may be predetermined and/or may be the maximum allowable webbing payout when the seat belt 16 is properly stowed. If the shoulder webbing payout and/or the lap webbing payout is greater than the first amount, the method continues at 230. Otherwise, the method ends and/or continues to another step in the method of FIG. 3 or 4. At 230, the UID control module 92 controls the user interface device 54 to send a message to the occupant indicating that that the seat belt 16 or sensing system needs serviced since the outputted payout is shorter than physically possible.

Figure 10:
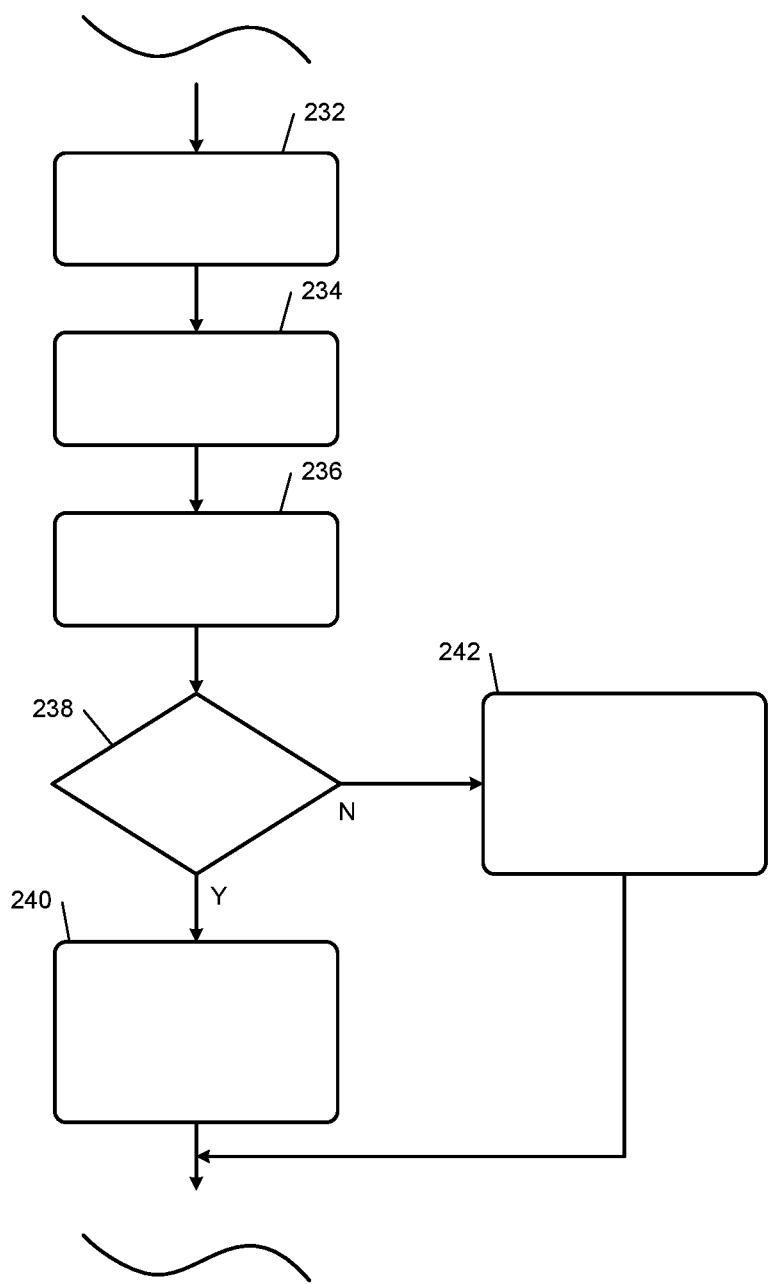
FIG. 10 is a flowchart illustrating an example method of adjusting a stored relationship between webbing payout and seat belt routing when a child restraint seat is in a vehicle seat.

Referring now to FIG. 10, illustrated is a method for adjusting a stored relationship between webbing payout and seat belt routing when a child restraint seat is present in the vehicle seat 14. The method of FIG. 10 may be executed in conjunction with either one of the methods of FIGS. 3 and 4. If the method of FIG. 10 is executed in conjunction with one of the methods of FIGS. 3 and 4, any steps in the method of FIG. 10 that are redundant with the steps in the methods of FIGS. 3 and 4 may be omitted.

At 232, the sensor state module 88 wakes up the in-cabin sensors 57 if the in-cabin sensors 57 are not already awake. 232 may be executed if a change in the shoulder and/or lap webbing payout is greater than a fourth delta value with respect to (i) the payout when the in-cabin sensors 57 were hibernated or (ii) a stored length of the seat belt 16 at its minimum payout length when it is first worn by an occupant or when it is first routed around a child restraint seat. At 234, the seat belt routing module 90 monitors the seat belt routing using the in-cabin sensors 57. At 236, the occupant detection module 84 monitors the occupancy of the seat 14 using the in-cabin sensors 57. At 238, the occupant detection module 84 determines whether an object such as a child restraint seat is present in the vehicle seat 14 or an occupant is in the vehicle seat 14 without a child restraint seat. If an object such as a child restraint seat is present in the vehicle seat 14, the method continues at 240. Otherwise, the method continues at 242.

At 240, the seat belt routing module 90 adjust the stored relationship between the webbing payout and the seat belt routing to settings that are specific for use with a child restraint seat. Additionally or alternatively, the seat belt routing module 90 may adjust the stored relationship between the spool position and the webbing payout. For example, the seat belt routing module 90 may reset the stored static length(s) of the seat belt 16.

At 242, the seat belt routing module 90 adjust the stored relationship between the webbing payout and the seat belt routing to settings that are specific for an occupant in the vehicle seat 14 without a child restraint seat. Additionally or alternatively, the seat belt routing module 90 may adjust the stored relationship between the spool position and the webbing payout. For example, the seat belt routing module 90 may reset the stored static length(s) of the seat belt 16. After 240 or 242, the method ends and/or continues to another step in the method of FIG. 3 or 4. If, at 238, the occupant detection module 84 determines that the vehicle seat 14 is empty, the occupant detection module 84 may either continue at 240 or continue at 242. In other words, an empty seat may be included with either the object/child restraint seat category or the occupant directly on the seat category.

Figure 11:
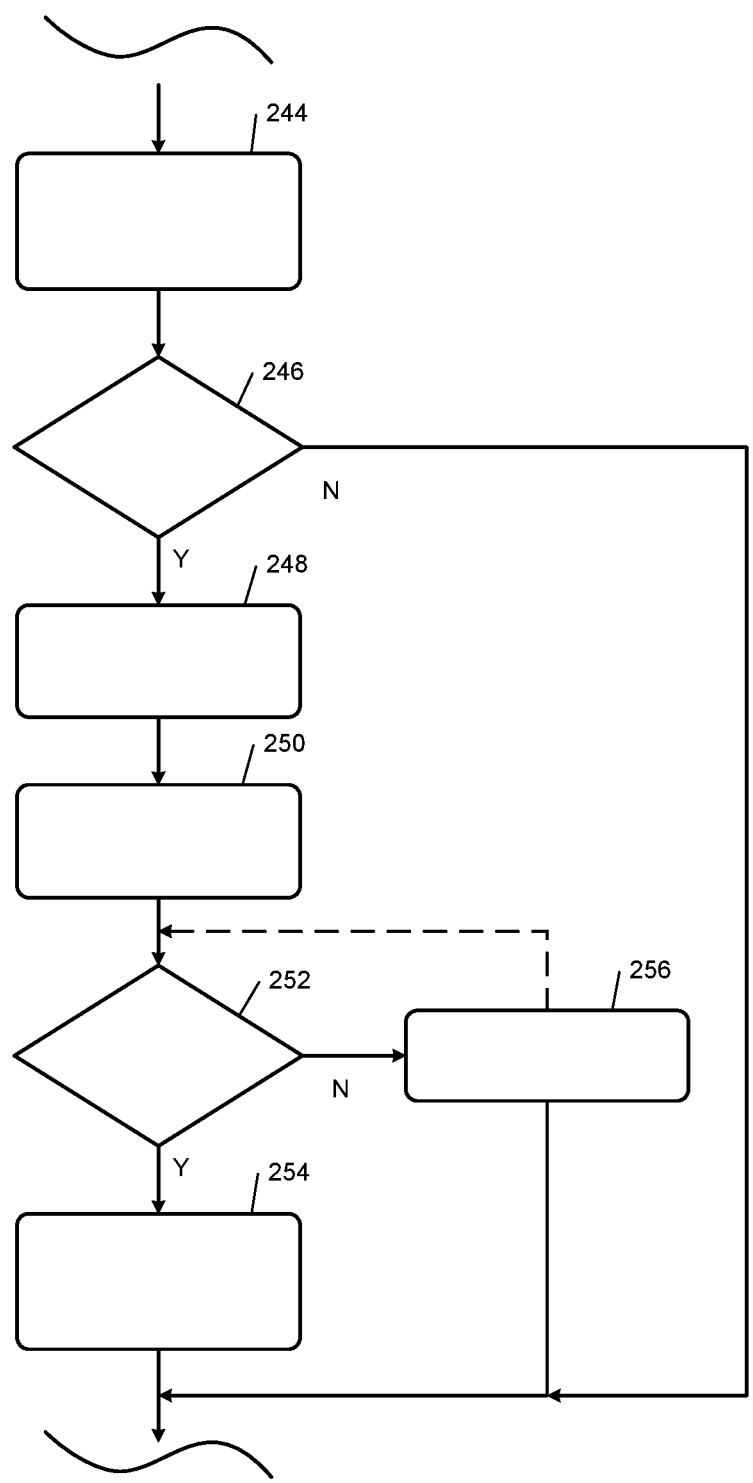
FIG. 11 is a flowchart illustrating an example method of accounting for changes in seat position when monitoring seat belt routing.

Referring now to FIG. 11, a method of accounting for changes in seat position when monitoring seat belt routing is illustrated. The method of FIG. 11 may be executed in conjunction with either one of the methods of FIGS. 3 and 4. If the method of FIG. 11 is executed in conjunction with one of the methods of FIGS. 3 and 4, any steps in the method of FIG. 11 that are redundant with the steps in the methods of FIGS. 3 and 4 may be omitted.

At 244, the seat position module 82 monitors (e.g. repeatedly measures) the position of the seat 14. The seat position module 82 may monitor the seat position based on the inputs from the seat position sensors 59, 60. Additionally or alternatively, the seat position module 82 may monitor the seat position based on the inputs from the in-cabin sensors 57.

At 246, the seat belt routing module 90 determines whether the seat 14 is moving or has just moved. If the seat 14 is moving or has just moved, the method continues at 248. Otherwise, the method ends and/or continues to another step in FIG. 3 or 4. At 248, the sensor state module 88 wakes up the in-cabin sensors 57 if the in-cabin sensors 57 are not already awake. At 250, the seat belt routing module 90 monitors the seat belt routing using the in-cabin sensors 57.

At 252, the seat belt routing module 90 determines whether the seat belt 16 is routed across the chest and over the shoulder of an occupant in the seat 14. If the seat belt 16 is routed across the chest and over the shoulder of the occupant, the method continues at 254. Otherwise, the method continues at 256. At 254, the seat belt routing module 90 adjust the stored relationship between the webbing payout and the seat belt routing to account for the change in seat position. 254 may be executed after the seat 14 stops moving, either by waiting to execute 254 until the seat 14 stops moving or repeating the method of FIG. 11. At 256, the UID control module 92 controls the user interface device 54 to send a message to the occupant indicating that the seat belt 16 is not being worn properly. After 256, the method may return to 252 (dashed arrow in FIG. 11), or the method may end and/or continue to another step in FIG. 3 or 4.

Figure 12:
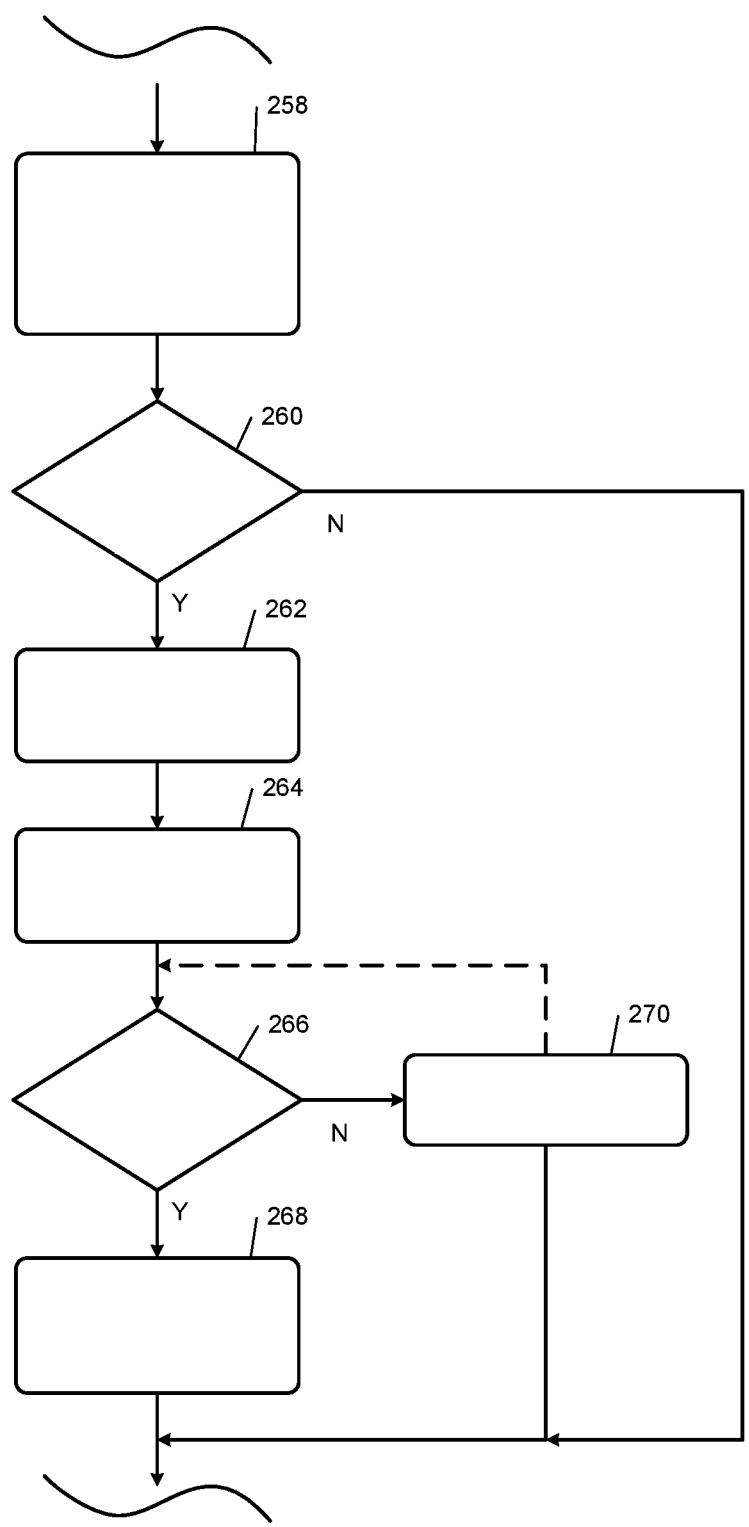
FIG. 12 is a flowchart illustrating an example method of accounting for changes in guideloop position when monitoring seat belt routing.

Referring now to FIG. 12, a method of accounting for changes in guideloop position when monitoring seat belt routing is illustrated. The method of FIG. 12 may be executed in conjunction with either one of the methods of FIGS. 3 and 4. If the method of FIG. 12 is executed in conjunction with one of the methods of FIGS. 3 and 4, any steps in the method of FIG. 12 that are redundant with the steps in the methods of FIGS. 3 and 4 may be omitted.

At 258, the seat belt routing module 90 monitors (e.g., repeatedly measures) the position of the guideloop 31. The seat belt routing module 90 may monitor the guideloop position based on the input from the guideloop position sensor 61. Additionally or alternatively, the seat belt routing module may monitor the guideloop position based on the input from the in-cabin sensors 57.

At 260, the seat belt routing module 90 determines whether the guideloop 31 is moving or has just moved. If the guideloop 31 is moving or has just moved, the method continues at 262. Otherwise, the method ends and/or continues to another step in the method of FIG. 3 or 4. At 262, the sensor state module 88 wakes up the in-cabin sensors 57 if the in-cabin sensors 57 are not already awake. At 264, the seat belt routing module 90 monitors the seat belt routing using the in-cabin sensors 57.

At 266, the seat belt routing module 90 determines whether the seat belt 16 is routed across the chest and over the shoulder of an occupant in the seat 14. If the seat belt 16 is routed across the chest and over the shoulder of the occupant, the method continues at 268. Otherwise, the method continues at 270. At 268, the seat belt routing module 90 adjust the stored relationship between the webbing payout and the seat belt routing to account for the change in guideloop position. 268 may be executed after the guideloop 31 stops moving, either by waiting to execute 268 until the guideloop 31 stops moving or repeating the method of FIG. 11. At 270, the UID control module 92 controls the user interface device 54 to send a message to the occupant indicating that the seat belt 16 is not being worn properly. After 270, the method may return to 266 (dashed arrow in FIG. 11), or the method may end and/or continue to another step in FIG. 3 or 4.

Figure 13:
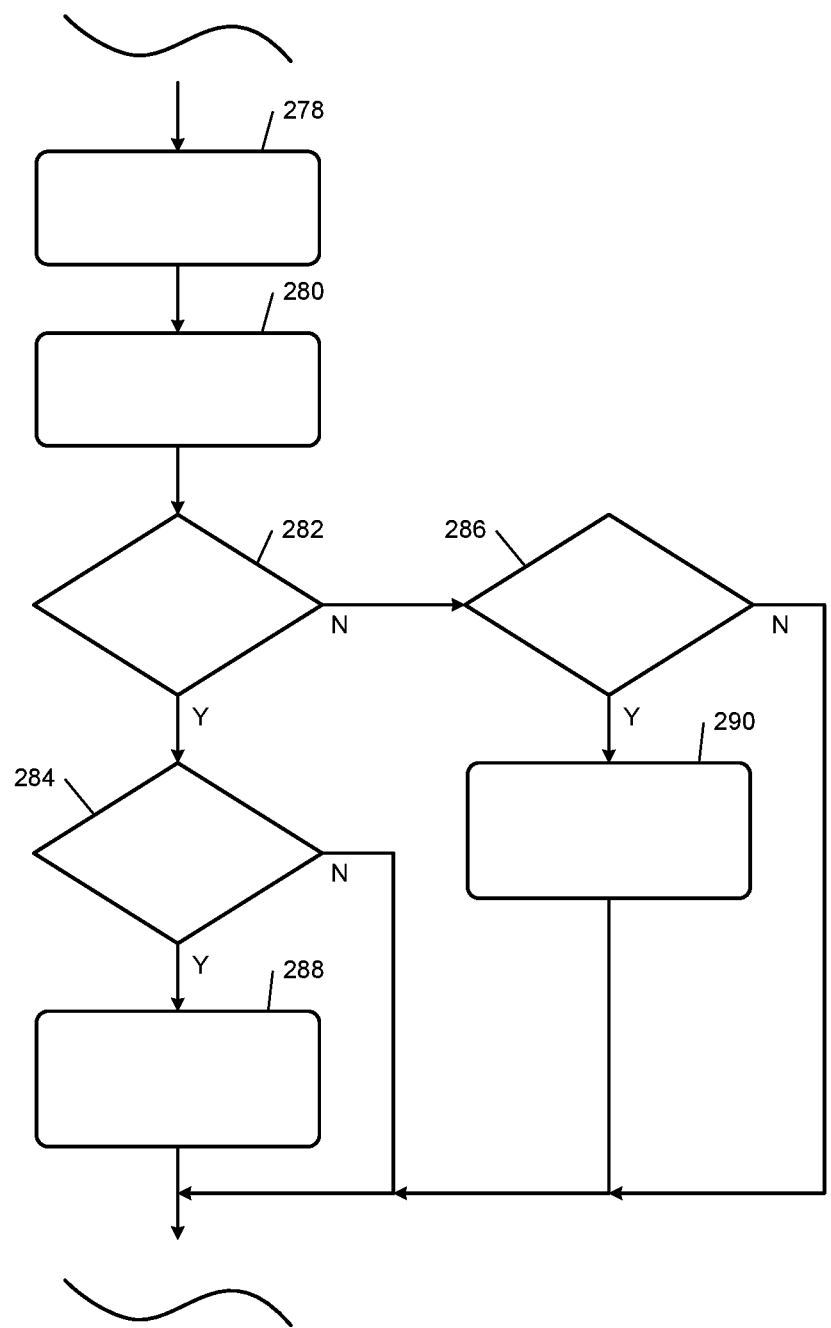
FIG. 13 is a flowchart illustrating an example method of monitoring seat belt routing relative to a routing guide.

FIG. 13 illustrates a method for determining whether the routing guide 17 is used and for communicating with an occupant regarding whether the routing guide 17 should be used. The method of FIG. 13 may be executed in conjunction with either one of the methods of FIGS. 3 and 4. If the method of FIG. 13 is executed in conjunction with one of the methods of FIGS. 3 and 4, any steps in the method of FIG. 13 that are redundant with the steps in the methods of FIGS. 3 and 4 may be omitted.

At 278, the occupant detection module 84 monitors the occupancy of the seat 14 using the in-cabin sensors 57. At 280, the seat belt routing module 90 monitors the seat belt routing using the in-cabin sensors 57. The seat belt routing module 90 may also identify the location of the routing guide 17 and/or the location of the seat belt 16 relative to the routing guide 17. At 282, the seat belt routing module 90 determines whether the seat belt 16 is routed through the routing guide 17. If the seat belt 16 is routed through the routing guide 17, the method continues at 284. Otherwise, the method continues at 286.

At 284, the occupant detection module 84 determines whether a large occupant (e.g., an adult) is seated on the seat 14 without a child restraint seat. The occupant detection module 84 may make this determination based on the detected occupant size, routing geometry and/or the payout length. If a large occupant is seated in the seat 14 without a child restraint seat, the method continues at 288. Otherwise, the method ends and/or continues to another step in FIG. 3 or 4. At 288, the UID control module 92 controls the user interface device 54 to send a message to the occupant indicating that the seat belt 16 should not be routed through the routing guide 17. If the seat belt 16 was just inserted through the routing guide 17, the seat belt routing module 90 may adjust the stored static length.

At 286, the occupant detection module 84 determines whether a small occupant (e.g., a child) is seated on the seat 14 without a child restraint seat. The occupant detection module 84 may make this determination based on the detected occupant size, routing geometry and/or the payout length. If a small occupant is seated in the seat 14 without a child restraint seat, the method continues at 290. Otherwise, the method ends and/or continues to another step in FIG. 3 or 4. At 290, the UID control module 92 controls the user interface device 54 to send a message to the occupant indicating that the seat belt 16 should be routed through the routing guide 17. If the seat belt 16 was just removed from the routing guide 17, the seat belt routing module 90 may adjust the stored static length. After 288 and 290, the method ends and/or continues to another step in FIG. 3 or 4.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
   a seat belt routing module configured to:
      determine a routing of a seat belt relative to an occupant in a seat of a vehicle based on input from a webbing payout sensor that measures a webbing payout of the seat belt; and
      determine the seat belt routing based on an input from an in-cabin sensor located within a cabin of the vehicle, wherein the in-cabin sensor includes at least one of a camera, an infrared sensor, an ultrasonic sensor, a radar sensor, and a lidar sensor;
   a user interface device (UID) control module configured to control a user interface device to indicate that the seat belt is being worn improperly when:
      the seat belt routing determined using at least one of the webbing payout sensor and the in-cabin sensor is improper; and
      the seat belt routing determined using the webbing payout sensor corresponds to the seat belt routing determined using the in-cabin sensor; and
   a sensor state module configured to activate the in-cabin sensor when a first change in the webbing payout is greater than a first delta value,
   wherein the sensor state module is configured to deactivate the in-cabin sensor when, after the seat belt routing module determines the seat belt routing using the in-cabin sensor, a second change in the webbing payout is less than a second delta value.

2. The system of claim 1 further comprising a sensor state module configured to activate at least one of the webbing payout sensor and the in-cabin sensor when a buckle sensor indicates that the seat belt is buckled.

3. The system of claim 1 wherein the seat belt routing module is configured to repeatedly determine the seat belt routing based on the input from the in-cabin sensor when the in-cabin sensor is activated.

4. The system of claim 1 wherein the seat belt routing module is configured to:
   determine a plurality of possible seat belt routings based on the webbing payout; and
   determine that the seat belt routing determined using the webbing payout sensor corresponds to the seat belt routing determined using the in-cabin sensor when one of the plurality of possible seat belt routings match the seat belt routing determined using the in-cabin sensor.

5. The system of claim 1 wherein the seat belt routing module is configured to:
   determine a plurality of possible seat belt routings based on the input from the in-cabin sensor; and
   determine that the seat belt routing determined using the webbing payout sensor corresponds to the seat belt routing determined using the in-cabin sensor when one of the plurality of possible seat belt routings match the seat belt routing determined using the webbing payout sensor.

6. The system of claim 1 wherein:
   when the seat belt routing determined using the webbing payout sensor does not correspond to the seat belt routing determined using the in-cabin sensor, the seat belt routing module is configured to select one of the webbing payout sensor and the in-cabin sensor as a primary sensor; and
   the UID control module is configured to control the user interface device to indicate that the seat belt is being worn improperly when the seat belt routing determined using the primary sensor is improper.

7. The system of claim 6 wherein the seat belt routing module is configured to select one of the webbing payout sensor and the in-cabin sensor as the primary sensor based on at least one of:
   whether the in-cabin sensor detects a shoulder webbing of the seat belt;
   a confidence in the seat belt routing determined using the webbing payout sensor; and
   a confidence in the seat belt routing determined using the in-cabin sensor.

8. The system of claim 6 further comprising an occupant posture module configured to determine a posture of the occupant based on the input from the in-cabin sensor, wherein the seat belt routing module is configured to select the in-cabin sensor as the primary sensor when the occupant posture is non-erect.

9. The system of claim 1 wherein the seat belt routing module is configured to;
   store a relationship between the webbing payout and the seat belt routing; and
   determine the seat belt routing based on the webbing payout using the stored relationship between the webbing payout and the seat belt routing.

10. The system of claim 9 wherein the seat belt routing module is configured to adjust the stored relationship when a buckle sensor indicates that the seat belt is buckled and an acceleration sensor indicates that a deceleration of the vehicle is greater than a predetermined rate.

11. The system of claim 9 wherein the seat belt routing module is configured to adjust the stored relationship when a buckle sensor indicates that the seat belt is buckled and, based on the input from the in-cabin sensor, the seat belt routing module determines that the seat belt is being properly worn.

12. The system of claim 9 wherein the seat belt routing module is configured to adjust the stored relationship when, based on the input from the in-cabin sensor, the seat belt routing module determines that the seat belt is being properly, stowed.

13. The system of claim 9 further comprising an occupant detection module configured to detect whether a child restraint seat is present in the vehicle seat, wherein the seat belt routing module is configured to adjust the stored relationship based on whether the child restraint seat is present in the vehicle seat.

14. The system of claim 9 wherein the seat belt routing module is configured to adjust the stored relationship when:
   at least one of the in-cabin sensor and a seat bottom position sensor indicates that the vehicle seat has moved; and
   based on the input from the in-cabin sensor, the seat belt routing module determines that the seat belt is being properly worn.

15. The system of claim 9 wherein the seat belt routing module is configured to adjust the stored relationship when:
   at least one of the in-cabin sensor and a guideloop position sensor indicates that a guideloop for the seat belt has moved; and
   based on the input from the in-cabin sensor, the seat belt routing module determines that the seat belt is being properly worn.

16. A system comprising:
   a seat belt routing module configured to:
      determine a routing of a seat belt relative to an occupant in a seat of a vehicle based on input from a webbing payout sensor that measures a webbing payout of the seat belt;
      determine the seat belt routing based on an input from an in-cabin sensor located within a cabin of the vehicle, wherein the in-cabin sensor includes at least one of a camera, an infrared sensor, an ultrasonic sensor, a radar sensor, and a lidar sensor;
      assign a first confidence to the seat belt routing determined using the webbing payout sensor;
      assign a second confidence to the seat belt routing determined using the in-cabin sensor; and
      select one of the webbing payout sensor and the in-cabin sensor as a primary sensor based on the first and second confidences; and
   a user interface device (UID) control module configured to control a user interface device to indicate that the seat belt is being worn improperly when the seat belt routing determined using the primary sensor is improper.

17. The system of claim 16 wherein the seat belt routing module is configured to:
   select the webbing payout sensor as the primary sensor when the first confidence is greater than the second confidence; and
   select the in-cabin sensor as the primary sensor when the second confidence is greater than the first confidence.

18. The system of claim 16 wherein the seat belt routing module is configured to:
   assign the first confidence based on whether the seat belt routing determined using the webbing payout sensor is a lap webbing routing or a shoulder webbing routing; and
   assign the second confidence based on whether a field of view of the in-cabin sensor is obstructed.

19. A system comprising:
   a seat belt routing module configured to:
      determine a routing of a seat belt relative to an occupant in a seat of a vehicle based on input from a webbing payout sensor that measures a webbing payout of the seat belt; and
      determine the seat belt routing based on an input from an in-cabin sensor located within a cabin of the vehicle, wherein the in-cabin sensor includes at least one of a camera, an infrared sensor, an ultrasonic sensor, a radar sensor, and a lidar sensor;
   a user interface device (UID) control module configured to control a user interface device to indicate that the seat belt is being worn improperly when:
      the seat belt routing determined using at least one of the webbing payout sensor and the in-cabin sensor is improper; and
      the seat belt routing determined using the webbing payout sensor corresponds to the seat belt routing determined using the in-cabin sensor,
   wherein;
      when the seat belt routing determined using the webbing payout sensor does not correspond to the seat belt routing determined using the in-cabin sensor, the seat belt routing module is configured to select one of the webbing payout sensor and the in-cabin sensor as a primary sensor; and
      the UID control module is configured to control the user interface device to indicate that the seat belt is being worn improperly when the seat belt routing determined using the primary sensor is improper, and
   at least one of:
      (a) the seat belt routing module is configured to select one of the webbing payout sensor and the in-cabin sensor as the primary sensor based on at least one of:
         whether the in-cabin sensor detects a shoulder webbing of the seat belt;
         a confidence in the seat belt routing determined using the webbing payout sensor; and
         a confidence in the seat belt routing determined using the in-cabin sensor; and
      (b) an occupant posture module configured to determine a posture of the occupant based on the input from the in-cabin sensor, wherein the seat belt routing module is configured to select the in-cabin sensor as the primary sensor when the occupant posture is non-erect.

20. A system comprising:
   a seat belt routing module configured to:
      determine a routing of a seat belt relative to an occupant in a seat of a vehicle based on input from a webbing payout sensor that measures a webbing payout of the seat belt; and
      determine the seat belt routing based on an input from an in-cabin sensor located within a cabin of the vehicle, wherein the in-cabin sensor includes at least one of a camera, an infrared sensor, an ultrasonic sensor, a radar sensor, and a lidar sensor;
   a user interface device (UID) control module configured to control a user interface device to indicate that the seat belt is being worn improperly when:
      the seat belt routing determined using at least one of the webbing payout sensor and the in-cabin sensor is improper; and
      the seat belt routing determined using the webbing payout sensor corresponds to the seat belt routing determined using the in-cabin sensor,
   wherein the seat belt routing module is configured to:

store a relationship between the webbing payout and the seat belt routing; and determine the seat belt routing based on the webbing payout using the stored relationship between the webbing payout and the seat belt routing; and at least one of:
- (a) the seat belt routing module is configured to adjust the stored relationship when a buckle sensor indicates that the seat belt is buckled and an acceleration sensor indicates that a deceleration of the vehicle is greater than a predetermined rate;
- (b) the seat belt routing module is configured to adjust the stored relationship when a buckle sensor indicates that the seat belt is buckled and, based on the input from the in-cabin sensor, the seat belt routing module determines that the seat belt is being properly worn;
- (c) the seat belt routing module is configured to adjust the stored relationship when, based on the input from the in-cabin sensor, the seat belt routing module determines that the seat belt is being properly stowed;
- (d) the system further comprises an occupant detection module configured to detect whether a child restraint seat is present in the vehicle seat, wherein the seat belt routing module is configured to adjust the stored relationship based on whether the child restraint seat is present in the vehicle seat;
- (e) the seat belt routing module is configured to adjust the stored relationship when:
  at least one of the in-cabin sensor and a seat bottom position sensor indicates that the vehicle seat has moved; and
  based on the input from the in-cabin sensor, the seat belt routing module determines that the seat belt is being properly worn; and
- (f) the seat belt routing module is configured to adjust the stored relationship when:
  at least one of the in-cabin sensor and a guideloop position sensor indicates that a guideloop for the seat belt has moved; and
  based on the input from the in-cabin sensor, the seat belt routing module determines that the seat belt is being properly worn.

* * * * *